United States Patent
Michaels

(10) Patent No.: US 8,345,725 B2
(45) Date of Patent: Jan. 1, 2013

(54) HIDDEN MARKOV MODEL DETECTION FOR SPREAD SPECTRUM WAVEFORMS

(75) Inventor: Alan J. Michaels, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 408 days.

(21) Appl. No.: 12/721,982

(22) Filed: Mar. 11, 2010

(65) Prior Publication Data

US 2011/0222584 A1    Sep. 15, 2011

(51) Int. Cl.
*H04B 1/00* (2006.01)
(52) U.S. Cl. ........ 375/130; 375/133; 375/137; 375/140; 375/143; 375/145; 375/146; 375/149; 375/150; 375/152; 375/299; 375/343; 375/354; 375/349; 375/358
(58) Field of Classification Search .................. 375/130, 375/343, 133–137, 140–143, 145, 146, 149, 375/150, 152, 299, 349, 354, 358, E1.001–E1.003
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,596,600 A | 1/1997 | Dimos et al. |
| 5,598,476 A | 1/1997 | LaBarre et al. |
| 5,646,997 A | 7/1997 | Barton |

(Continued)

FOREIGN PATENT DOCUMENTS

EP    0849664 A2    6/1998

(Continued)

OTHER PUBLICATIONS

Galias et al. "quadrature Chaos-shift keying- theory and performance analysis",Dec. 2001; IEEE transactions on circuits and systems Part I, vol. 48 ,No. 12, pp. 1510-1518.*

(Continued)

*Primary Examiner* — David Ometz
*Assistant Examiner* — Rahel Guarino
(74) *Attorney, Agent, or Firm* — Fox Rothschild, LLP; Robert J. Sacco

(57) ABSTRACT

Systems (100) and methods (700) for processing a data signal in a communications system. The methods involve generating a first chaotic sequence at a transmitter (102). The methods also involve performing first basis function algorithms using the first chaotic sequence to generate first statistically orthogonal chaotic sequences. At least one sequence is selected from the first statistically orthogonal chaotic sequences for combining with a first data signal. The selected sequence is combined with a second data signal to obtain a modulated chaotic communication signal. The modulated chaotic communication signal is transmitted to a receiver (104). At the receiver, the received modulated chaotic communication signal is processed to obtain data therefrom. Notably, the signal processing generally involves performing a deterministic process (e.g., a Hidden Markov Model deterministic process).

45 Claims, 12 Drawing Sheets

U.S. PATENT DOCUMENTS

| | | |
|---|---|---|
| 5,677,927 A | 10/1997 | Fullerton et al. |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A | 7/1999 | Abarbanel et al. |
| 5,924,980 A | 7/1999 | Coetzee |
| 5,937,000 A | 8/1999 | Lee et al. |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,212,239 B1 | 4/2001 | Hayes |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,331,974 B1 | 12/2001 | Yang et al. |
| 6,377,782 B1 | 4/2002 | Bishop et al. |
| 6,473,448 B1 | 10/2002 | Shono et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 | 7/2004 | Stein et al. |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 | 3/2005 | Sourour |
| 6,888,813 B1 | 5/2005 | Kishi |
| 6,901,104 B1 | 5/2005 | Du et al. |
| 6,937,568 B1 | 8/2005 | Nicholl et al. |
| 6,980,656 B1 | 12/2005 | Hinton, Sr. et al. |
| 6,980,657 B1 | 12/2005 | Hinton, Sr. et al. |
| 6,986,054 B2 | 1/2006 | Kaminaga et al. |
| 6,993,016 B1 | 1/2006 | Liva et al. |
| 6,999,445 B1 | 2/2006 | Dmitriev et al. |
| 7,023,323 B1 | 4/2006 | Nysen |
| 7,027,598 B1 | 4/2006 | Stojancic et al. |
| 7,035,220 B1 | 4/2006 | Simcoe |
| 7,069,492 B2 | 6/2006 | Piret |
| 7,076,065 B2 | 7/2006 | Sherman et al. |
| 7,078,981 B2 | 7/2006 | Farag |
| 7,079,651 B2 | 7/2006 | Den Boer |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 | 5/2010 | Feher |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 | 4/2011 | Ozluturk et al. |
| 7,974,146 B2 | 7/2011 | Barkley |
| 2001/0017883 A1 | 8/2001 | Tiirola et al. |
| 2002/0012403 A1 | 1/2002 | McGowan et al. |
| 2002/0034191 A1 | 3/2002 | Shattil |
| 2002/0034215 A1 | 3/2002 | Inoue et al. |
| 2002/0041623 A1 | 4/2002 | Umeno |
| 2002/0054682 A1 | 5/2002 | Di Bernardo et al. |
| 2002/0099746 A1 | 7/2002 | Tie et al. |
| 2002/0110182 A1 | 8/2002 | Kawai |
| 2002/0115461 A1 | 8/2002 | Shiraki et al. |
| 2002/0122465 A1 | 9/2002 | Agee et al. |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1 | 1/2003 | Lambert |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1 | 9/2003 | Johnson et al. |
| 2003/0198184 A1 | 10/2003 | Huang et al. |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1 | 5/2004 | Hartson et al. |
| 2004/0146095 A1 | 7/2004 | Umeno et al. |
| 2004/0156427 A1 | 8/2004 | Gilhousen et al. |
| 2004/0161022 A1 | 8/2004 | Glazko et al. |
| 2004/0165681 A1 | 8/2004 | Mohan |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 | 2/2005 | Samid |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 | 6/2005 | Zhengdi et al. |
| 2005/0207574 A1 | 9/2005 | Pitz et al. |
| 2005/0249271 A1 | 11/2005 | Lau et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0072754 A1 | 4/2006 | Hinton et al. |
| 2006/0088081 A1 | 4/2006 | Withington et al. |
| 2006/0093136 A1 | 5/2006 | Zhang et al. |
| 2006/0123325 A1 | 6/2006 | Wilson et al. |
| 2006/0209926 A1 | 9/2006 | Umeno et al. |
| 2006/0209932 A1 | 9/2006 | Khandekar et al. |
| 2006/0251250 A1 | 11/2006 | Ruggiero et al. |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 | 6/2007 | Koslar |
| 2007/0195860 A1 | 8/2007 | Yang et al. |
| 2007/0201535 A1 | 8/2007 | Ahmed |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 | 1/2008 | Lablans |
| 2008/0075195 A1 | 3/2008 | Pajukoski et al. |
| 2008/0080439 A1 | 4/2008 | Aziz et al. |
| 2008/0084919 A1 | 4/2008 | Kleveland et al. |
| 2008/0095215 A1 | 4/2008 | McDermott et al. |
| 2008/0107268 A1 | 5/2008 | Rohde et al. |
| 2008/0198832 A1 | 8/2008 | Chester |
| 2008/0204306 A1 | 8/2008 | Shirakawa |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |
| 2008/0307022 A1 | 12/2008 | Michaels et al. |
| 2008/0307024 A1 | 12/2008 | Michaels et al. |
| 2009/0022212 A1 | 1/2009 | Ito et al. |
| 2009/0034727 A1 | 2/2009 | Chester et al. |
| 2009/0044080 A1 | 2/2009 | Michaels et al. |
| 2009/0059882 A1 | 3/2009 | Hwang et al. |
| 2009/0110197 A1 | 4/2009 | Michaels |
| 2009/0122926 A1 | 5/2009 | Azenkot et al. |
| 2009/0196420 A1 | 8/2009 | Chester et al. |
| 2009/0202067 A1 | 8/2009 | Michaels et al. |

| | | | |
|---|---|---|---|
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0285395 A1 | 11/2009 | Hu et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 | 12/2009 | Wang et al. | |
| 2009/0327387 A1 | 12/2009 | Michaels et al. | |
| 2010/0030832 A1 | 2/2010 | Mellott | |
| 2010/0054225 A1 | 3/2010 | Hadef et al. | |
| 2010/0054228 A1 | 3/2010 | Michaels | |
| 2010/0073210 A1 | 3/2010 | Bardsley et al. | |
| 2010/0091700 A1 | 4/2010 | Michaels | |
| 2010/0111296 A1 | 5/2010 | Brown et al. | |
| 2010/0142593 A1 | 6/2010 | Schmid | |
| 2010/0165828 A1 | 7/2010 | Michaels et al. | |
| 2010/0166041 A1* | 7/2010 | Michaels et al. | 375/141 |
| 2010/0226497 A1 | 9/2010 | Michaels et al. | |
| 2010/0254430 A1 | 10/2010 | Lee et al. | |
| 2010/0260276 A1 | 10/2010 | Orlik et al. | |
| 2010/0309957 A1 | 12/2010 | Chester et al. | |
| 2010/0310072 A1 | 12/2010 | Michaels et al. | |
| 2010/0316090 A1 | 12/2010 | Chester et al. | |
| 2011/0002360 A1 | 1/2011 | Michaels et al. | |
| 2011/0002362 A1 | 1/2011 | Michaels et al. | |
| 2011/0002364 A1 | 1/2011 | Michaels et al. | |
| 2011/0002366 A1 | 1/2011 | Michaels et al. | |
| 2011/0002460 A1 | 1/2011 | Michaels et al. | |
| 2011/0002463 A1 | 1/2011 | Michaels et al. | |
| 2011/0004792 A1 | 1/2011 | Michaels et al. | |
| 2011/0019719 A1 | 1/2011 | Michaels et al. | |
| 2011/0019817 A1 | 1/2011 | Michaels et al. | |
| 2011/0222393 A1 | 9/2011 | Kwak et al. | |

FOREIGN PATENT DOCUMENTS

| | | |
|---|---|---|
| EP | 0949563 A2 | 10/1999 |
| EP | 2000900 A2 | 12/2008 |
| EP | 2000902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2005017612 A | 1/2005 |
| WO | WO-0135572 A2 | 5/2001 |
| WO | WO-2006110954 A1 | 10/2006 |
| WO | WO-2008065191 A1 | 6/2008 |
| WO | WO-2008099367 A2 | 8/2008 |
| WO | WO-2008130973 A1 | 10/2008 |
| WO | WO-2009146283 A1 | 12/2009 |

OTHER PUBLICATIONS

Kolumbán et al. "chaotic communications with correlator receivers: theory and performance limits"; May 2002; proceedings of the EEE,vol. 90 No. 5, pp. 711-730.*
Office Action issued in Japanese Patent Application No. 2010-504206 in the name of Harris Corporation; mailed Jan. 6, 2012.
Socek, D., et al., Short Paper: Enhanced 1-D Chaotic Key Based Algorithm for Image Encryption, Sep. 2005, IEEE.
Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.
Pirkin, Llya, Calculations in Galois Fields., C/C++ Users Journal; Oct. 2004, vol. 22 Issue 10, p. 14-18, 4p, 1 Color Photograph.
Popescu, Angel, A Galois Theory for the Field Extension K ((X))/K., Glasgow Mathematical Journal; Sep. 2010, vol. 52 Issue 3, p. 447-451, 5p.
Pirkin, Ilya, Calculations in Galois Fields., C/C++ Users Journal; Oct. 2004, vol. 22 Issue 10, p. 14-18, 4p, 1 Color Photograph.
Diaz-Toca, G.M. and Lombardi, H. , Dynamic Galois Theory., Journal of Symbolic Computation; Dec. 2010, vol. 45 Issue 12, p. 1316-1329, 14p.
Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.
International Search Report mailed Dec. 30, 2011, European Patent Application No. 11001222.6, in the name of Harris Corporation.
Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.
Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.
Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.
Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.
De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.
Kolumban, et al., "Chaotic Communications with Correlator Receivers: Theory and Performance Limits" Proceedings of the IEEE, vol. 90, No. 5, May 2002.
Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].
Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.
Morsche et al., "Signals and Systems," lecture notes, University of Eindhoven, The Netherlands (1999).
Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi -bin/fulltext/117910986/PDFSTART>; [retrieved on Aug. 4, 2009] p. 47-p. 48; p. 50-p. 51.
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.
Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From Math World—A Wolfram Web Resource, created by Eric W. Weisstein, [online] [retrieved on Nov. 8, 2010] Retrieved from the Internet: <<http://mathworld.wolfram.com/Bijective.html>>.

Weisstein, E., Surjection:, From MathWorld—AWolfram Web Resource [online] [retrieved on Nov. 8, 2010] Retrieved from the Internet:<<http://mathworld.wolfram.com/surjection.html>>.

Weisstein, E., Injection:, From MathWorld—AWolfram Web Resource [online] [retrieved on Nov. 8, 2010] Retrieved from the Internet: <http://mathworld.wolfram.com/injection.html>>.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Taylor, F.J.: "Residue Arithmetic: A Tutorial with Examples", Computer, vol. 17. No. 5. pp. 50-62, May 1984, doi: 10/1109/MC. 1984. 1659138.

Barda, A; et al., "Chaotic signals for multiple access communications," Electrical and Electronics Engineers in Israel, 1995, Eighteenth Convention of, vol., no., pp. 2.1.3/1-2.1/3/5, Mar 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Bererber, S.M., et al., "Design of a CDMA System in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

El-Khamy S E: "New trends in wireless multimedia communications based on chaos and fractals" National Radio Science Conference, 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Information about Related Patents and Patent Applications, see section 6 of the accompanying Information Disclosure Statement Letter, which concerns Related Patents and Patent Applications.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

International Search Report mailed Jul. 22, 2011, Application Serial No. PCT/US2009/04276; Filing Date May 4, 2009, in the name of Harris Corporation.

Bender, et al., "Techniques for data hiding", 1995, IBM Systems Journal, vol. 35, pp. 313-336.

* cited by examiner

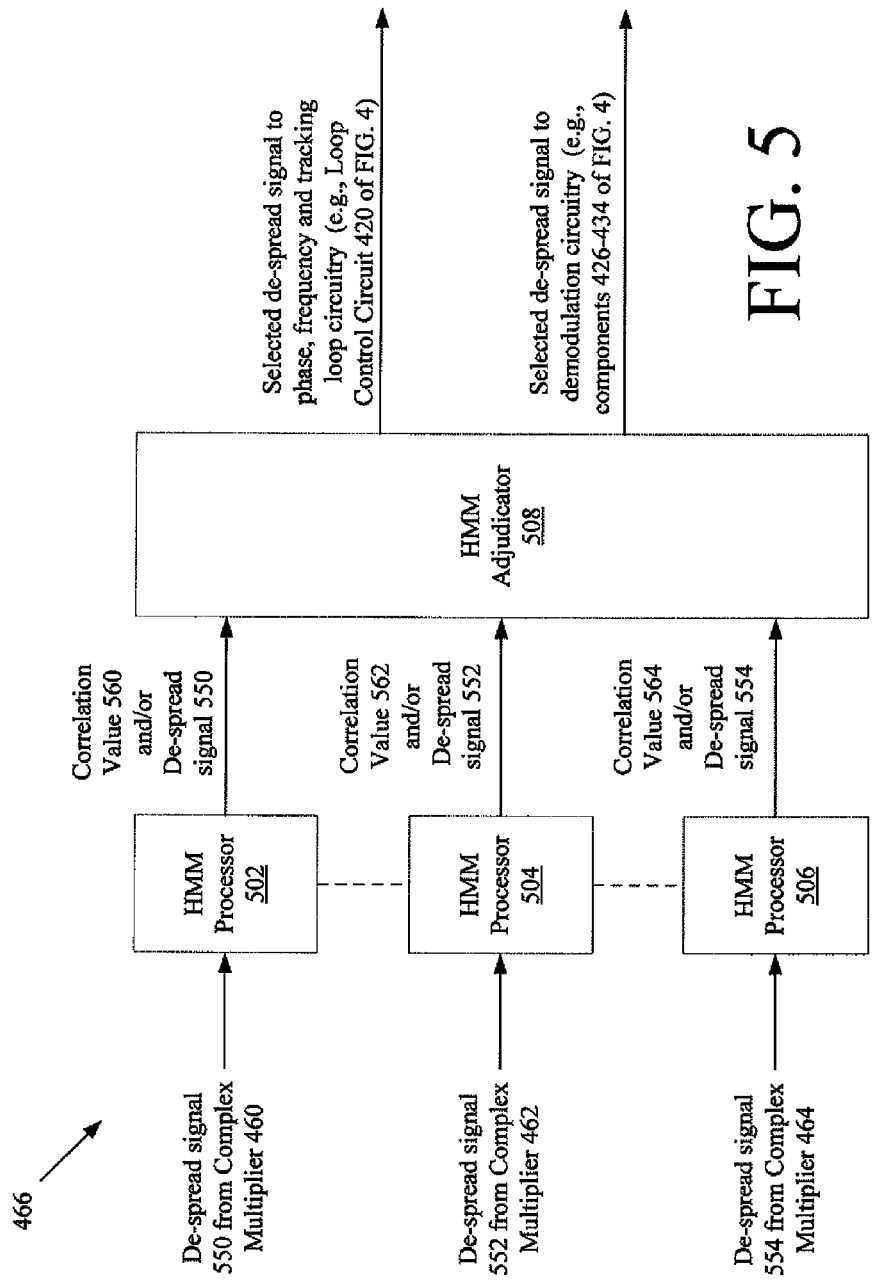

HIDDEN MARKOV MODEL DETECTION FOR SPREAD SPECTRUM WAVEFORMS

BACKGROUND OF THE INVENTION

1. Statement of the Technical Field

The invention concerns communications systems. More particularly, the invention concerns communications systems having a plurality of transmitted waveforms which communicate with corresponding receivers using spread spectrum waveforms.

2. Description of the Related Art

Pseudorandom number generators (PRNG) generally utilize digital logic or a digital computer and one or more algorithms to generate a sequence of pseudorandom numbers. While the output of conventional PRNG may approximate some of the properties of random numbers, they are not truly random. For example, the output of a PRNG has cyclo-stationary features that can be identified by analytical processes.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences digitally requires an impractical implementation due to the precisions required.

Communications systems utilizing chaotic sequences offer promise for being the basis of a next generation of secure waveforms. While many such communications systems have been developed for generating chaotically modulated waveforms, such communications systems suffer from low throughput. The term "throughput", as used herein, refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaotic signal generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift", as used herein, refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput and error rate performance. In this context, the phrase "non-coherent waveform" means that the receiver is not required to reproduce any synchronized copy of the chaotic signals that have been generated in the transmitter. The phrase "communications using a coherent waveform" means that the receiver is required to reproduce a synchronized copy of the chaotic signals that have been generated in the transmitter.

In view of the forgoing, there is a need for a coherent chaos-based communications system having an increased throughput. There is also a need for a chaos-based communications system configured for generating a signal having chaotic properties. As such, there is further a need for a chaos-based communications system that corrects drift between a transmitter and a receiver without an extreme compromise of throughput.

SUMMARY OF THE INVENTION

The present invention concerns implementing communication systems and methods for processing a data signal in a communications system. The methods generally involve generating a first chaotic sequence at a transmitter of a first communication device to be employed as a statistically orthogonal chaotic spreading signal. The phrase "statistically orthogonal", as used here, refers to a statistical expectation of zero correlation between a plurality of signals or sequences used as communications waveform basis functions. First basis function algorithms are performed using the first chaotic sequence to generate first statistically orthogonal chaotic sequences. Each of the first basis function algorithms can include, but is not limited to, a bijective function, a rotation algorithm, a scrambling algorithm, an XOR algorithm, an encryption algorithm, a uniform statistics preserving transformation, a statistical shaping transformation, a time-delayed statistical shaping transformation, and a fractal evolution statistical shaping transformation.

At least one sequence is selected from the first statistically orthogonal chaotic sequences for combining with a first data signal. More particularly, the sequence is selected from the first statistically orthogonal chaotic sequences based on at least one bit value of symbol formatted data contained in the first data signal. The selected sequence is combined with a second data signal to obtain a modulated chaotic communication signal. The modulated chaotic communication signal is transmitted to a receiver of a second communication device, where it is processed to obtain data therefrom.

At the receiver, a second chaotic sequence is generated which is a time synchronized replica of the first chaotic sequence generated at the transmitter. Second basis function algorithms are performed using the second chaotic sequence to generate at least two second statistically orthogonal chaotic sequences. Each of the second basis function algorithms can include, but is not limited to, a bijective function, a rotation algorithm, a scrambling algorithm, an XOR algorithm, an encryption algorithm, a uniform statistics preserving transformation, a statistical shaping transformation, a time-delayed statistical shaping transformation, and a fractal evolution statistical shaping transformation. Each of the second statistically orthogonal chaotic sequences is a time synchronized replica of a respective one of the possible selections of the first statistically orthogonal chaotic sequences generated at the transmitter. The received modulated chaotic communication signal is then combined with each of the second statistically orthogonal chaotic sequences to generate at least two observation signals. Each observation signal includes a plurality of observation symbols.

A plurality of correlation values are determined for the possible transmitted data symbols. Notably, each correlation value is associated with a respective one of the possible transmitted basis functions corresponding to the number of possible data symbols. Each correlation value is defined by at least a magnitude and a phase of the respective one of the possible transmitted data symbols. A series of first correlation values is selected from the plurality of correlation values. A largest correlation value is then identified from the series of first correlation values. A deterministic process is performed using the largest correlation value to determine if a series of observations associated therewith represents a data symbol of the first data signal. The deterministic process can include, but is not limited to, a Hidden Markov Model deterministic process, a decision tree based deterministic process, and a fractal evolution based deterministic process.

If the series of observations associated with the largest correlation is determined to represent a symbol of the first data signal, then the observation symbol is demodulated. If the observation symbol associated with the largest correlation is not determined to represent a symbol of the first data signal, then a correlation window can be adjusted to increase the series length of the observations associated with the largest correlation value. Also, the deterministic process can be adjusted or trained in accordance with results of a comparison of the observations at pre-defined observation periods to an a priori known sequence of data symbols from the first data signal.

BRIEF DESCRIPTION OF THE DRAWINGS

Embodiments will be described with reference to the following drawing figures, in which like numerals represent like items throughout the figures, and in which:

FIG. 5 is a more detailed block diagram of an exemplary Hidden Markov Model detector shown in FIG. 4A that is useful for understanding the present invention.

DETAILED DESCRIPTION OF THE PREFERRED EMBODIMENTS

Figure 1:
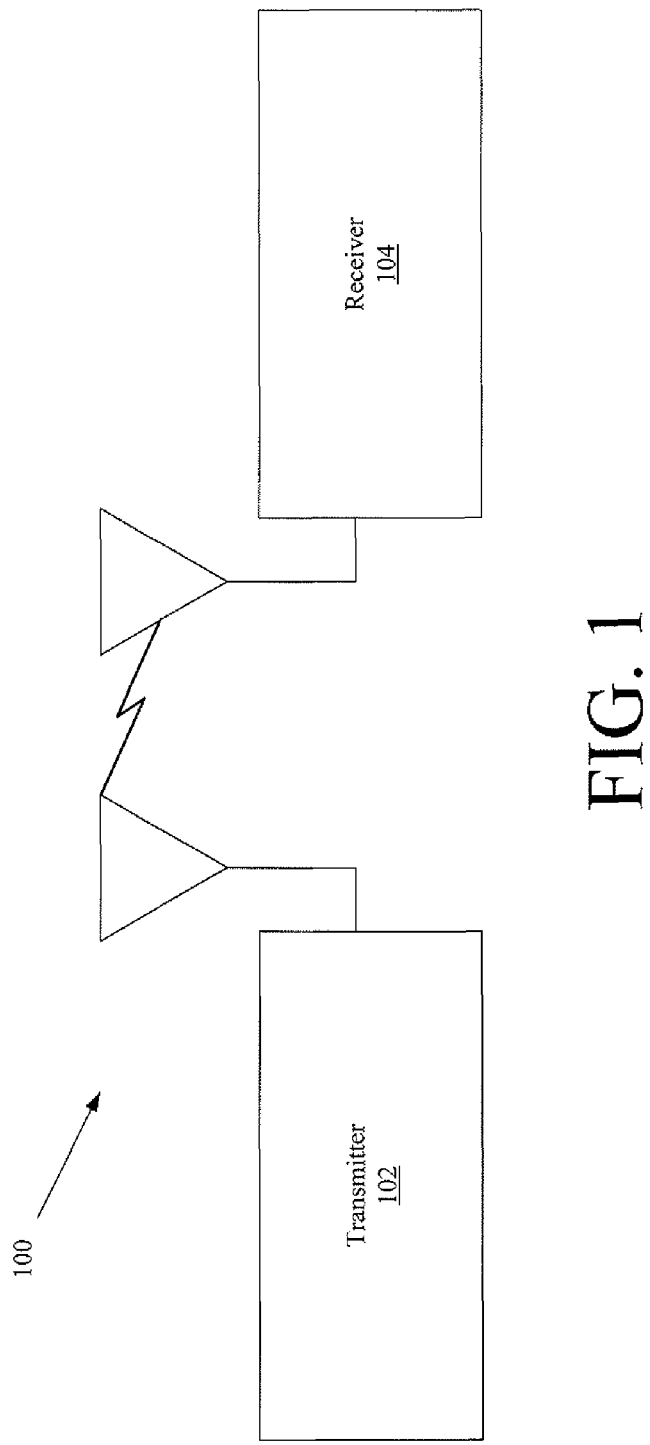
FIG. 1 is a block diagram of a coherent chaotic spread-spectrum communication system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention will now be described with respect to FIGS. 1-10. Some embodiments of the present invention provide a coherent chaotic spread-spectrum communications system. The coherent chaotic spread-spectrum communications system includes a receiver that utilizes a Hidden Markov Model (HMM) based technique for determining which observations from a plurality of observation signals best represents symbols of the data signal that was transmitted from a transmitter. Notably, the HMM based technique employed by the receiver of the present invention is particularly useful in power constrained platforms (e.g., SAT-COM tags) devices that emit short bursts, and cellular phones. In this regard, it should be appreciated that the HMM based technique allows for higher data throughputs of spread spectrum communications as compared to conventional communication systems. Also, the HMM based technique provides a power advantage to low Size, Weight and Power (SWaP) applications. Also, embodiments of the novel HMM based approach presented provides an adaptive length HMM training capability for recovering sections of data from packetized data bursts that would remain lost in a fixed length HMM approach.

Using the HMM based technique at the receiver, the transmitter of the coherent chaotic spread-spectrum communications system can simultaneously encode a data signal in both the symbol phase/amplitude modulation and in the selection of a spreading sequence that is to be used to spread the data signal. As such, the transmitter of the coherent chaotic spread-spectrum communications system can advantageously transmit a more compact data transmission as compared to data transmission from conventional spread spectrum communication systems. The compact data transmission occurs without an increase in energy per symbol as compared to the energy per symbol of a conventional data transmission.

Notably, the receiver of the coherent chaotic spread-spectrum communications system acts as a parallel set of matched filter receivers. Each of the matched filter receivers de-spreads a received signal using a time synchronized replica of a respective spreading sequence generated at the transmitter. The results of the de-spread operations are referred to as observation signals. Each of the observation signals includes a plurality of observations. Thereafter, the receiver processes the observations to determine correlations values therefore. A plurality of the correlation values is selected. Each selected correlation value is associated with a particular observations (e.g., a first, second, third or fourth) of a respective observation signal. The selected correlation values are compared against each other to determine which correlation value is the largest thereof. The largest correlation value is then used in a deterministic process to determine if the observation associated therewith represents a data symbol of the signal transmitted from the transmitter. Alternatively, the correlation values are compared against each other to determine an ordering or probability of occurrence. The ordering or probability of occurrence is then used in a deterministic process to determine the most likely series of data symbols transmitted from the transmitter associated with a series of observations. If the observation associated with the largest correlation value is determined to represent a data symbol associated with the signal transmitted from the transmitter, then it is further processed for demodulating the same. The demodulated symbol can be converted into text, sound, pictures, navigational-position information, and/or any other type of useful payload information that can be communicated.

Exemplary Coherent Chaotic Spread-Spectrum Communications System

Referring now to FIG. 1, there is provided a coherent chaotic spread-spectrum communication system 100 that is useful for understanding the present invention. Notably, the communication system 100 implements method embodiments of the present invention. Such method embodiments will be described below in relation to FIG. 7.

As shown in FIG. 1, the coherent chaotic spread-spectrum communication system 100 is comprised of a transmitter 102 and a receiver 104. The transmitter 102 is configured to generate an amplitude-and-time-discrete baseband signal and to spread the amplitude-and-time-discrete baseband signal over a wide intermediate frequency band. This spreading consists of multiplying the amplitude-and-time-discrete baseband signal by at least one digital chaotic sequence selected from a plurality of digital chaotic sequences. The product of the arithmetic operation(s) is(are) referred to as a digital chaotic signal(s). In this regard, it should be understood that the transmitter 102 is also configured to process the digital chaotic signal(s) to place the same in a proper analog form(s) suitable for transmission over a communications link. The transmitter 102 is further configured to communicate analog chaotic signals to the receiver 104 via a communications link. The transmitter 102 will be described below in more detail in relation to FIGS. 2-3.

The receiver 104 is configured to receive transmitted chaotic spread spectrum signals from the transmitter 102. The receiver 104 is also configured to down convert, digitize, and de-spread a transmitted chaotic spread spectrum signal by correlating it with time-synchronized replicas of the possible chaotic sequences generated at the transmitter 102. The chaotic sequences are time synchronized to the transmitted chaotic spread spectrum signal, i.e., a sampling rate of each of the chaotic sequences is the same as a sampling rate of the transmitted analog chaotic signal and is synchronized with a clock (not shown) of the transmitter 102. The outputs of the arithmetic operations that despreads the received signal are referred to as observation signals. The receiver 104 processes the observation signals to determine correlations values therefore. Thereafter, the receiver 104 compares the correlation values against each other to determine which correlation value is the largest thereof. The largest correlation value is then used in a deterministic process to determine if the observation signal associated therewith represents the signal transmitted from the transmitter 102. Alternatively, the correlation values are compared against each other to determine an ordering or probability of occurrence. The ordering or probability of occurrence is then used in a deterministic process to determine the most likely series of data symbols transmitted from the transmitter associated with a series of observations. If the observation signal associated with the largest correlation value is determined to represent a data symbol transmitted from the transmitter 102, then it is further processed for obtaining data contained therein. If the observation signal associated with a series of observations yields a significant amount of uncertainty as to the series of data symbols transmitted, then the length of the observation signal considered may be expanded to a larger series of observations. The data can be converted into text, sound, pictures, navigational-position information, and/or any other type of useful payload information that can be communicated. The receiver 104 is described in more detail below in relation to FIG. 4A-6.

Embodiments of Transmitter Architectures

Figure 2:
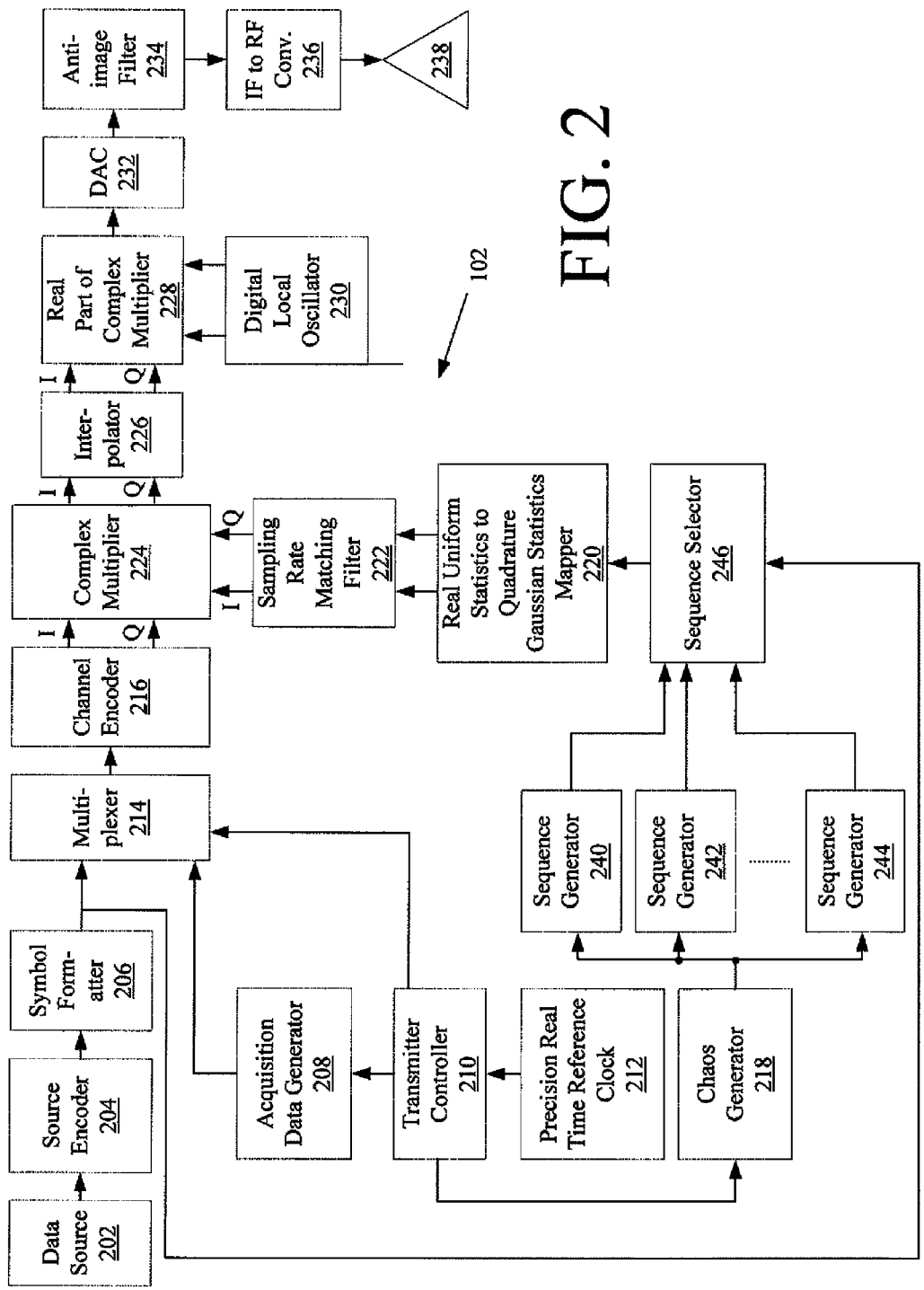
FIG. 2 is a block diagram of a first exemplary embodiment of a transmitter that is useful for understanding the present invention.

Referring now to FIG. 2, there is provided a bock diagram of the transmitter 102 shown in FIG. 1 that is useful for understanding the invention. As shown in FIG. 2, the transmitter 102 is comprised of a data source 202, a source encoder 204 and a symbol formatter 206, an Acquisition Data Generator (ADG) 208, a transmitter controller 210, a Precision Real Time Reference (PRTR) clock 212, a multiplexer 214, a channel encoder 216 and a digital complex multiplier 224. The transmitter 102 is also comprised of a chaos generator 218, a Real Uniform statistics to Quadrature Gaussian statistics mapper device (RUQG) 220, a Sample Rate Matching Filter (SRMF) 222, an interpolator 226, a digital Local Oscillator (LO) 230, a Real Part of a Complex Multiplier (RPCM) 228, a Digital-to-Analog Converter (DAC) 232, an anti-image filter 234, an Intermediate Frequency to Radio Frequency (IF-to-RF) conversion device 236 and an antenna element 238. The transmitter 102 is further comprised of a plurality of sequence generators 240, 242, . . . , 244 and a sequence selector 246. Although three (3) sequence generators 240, 242, . . . , 244 are shown in FIG. 2, embodiments of the present invention are not limited in this regard. The transmitter 102 can include two or more sequence generators.

The data source 202 is configured to receive bits of data from an external data source (not shown in FIG. 2). In this regard, it should be appreciated that the data source 202 is an interface configured for receiving an input signal containing data from an external device (not shown in FIG. 2). The data source 202 is further configured to supply bits of data to the source encoder 204 at a particular data transfer rate. The source encoder 204 can be configured to encode the data received from the external device (not shown in FIG. 2) using a forward error correction coding scheme. The bits of data received at or generated by the source encoder 204 represent any type of information that may be of interest to a user. For example, the data can be used to represent text, telemetry, audio or video data. The source encoder 204 is further configured to supply bits of data to the symbol formatter 206 at a particular data transfer rate.

The symbol formatter 206 is configured to process bits of data for forming channel encoded symbols. In one embodiment of the present invention, the source encoded symbols are phase shift keyed (PSK) encoded. The symbol formatter 206 can be further configured to communicate non-differentially encoded PSK symbols and/or differentially encoded PSK symbols to the multiplexer 214 and the sequence selector 246. The symbol formatter 206 can also be configured to format data symbols representative of any amplitude-and-time-discrete modulation type. Embodiments of the present invention are not limited in this regard. The symbol formatter 206 is functionally similar to a serial in/parallel out shift register where the number of parallel bits out is equal to log base two ($\log_2$) of the order of the channel encoder 216.

The ADG 208 is configured for generating a "known data preamble" that can be used to enable initial synchronization of a chaotic sequence generated in the transmitter 102 and the receiver (e.g., the receiver 104 of FIG. 1). The duration of this "known data preamble" is determined by an amount required by the receiver (e.g., the receiver 104 of FIG. 1) to synchronize with the transmitter 102 under known worst case channel conditions. In some embodiments of the present invention, the "known data preamble" is a repetition of the same known symbol. In other embodiments of the present invention, the "known data preamble" is a series of known symbols. The ADG 208 can be further configured to communicate the "known data preamble" to the multiplexer 214.

The multiplexer 214 is configured to receive the binary word to be modulated by the channel encoder from the symbol formatter 206. The multiplexer 214 is also configured to receive a "known data preamble" from the ADG 208. The multiplexer 214 is coupled to the transmitter controller 210. The transmitter controller 210 is configured to control the multiplexer 214 so that the multiplexer 214 (a) routes the "known data preamble" to the channel encoder 216 at the time of a new transmission and (b) routes the data symbols to the channel encoder 216 after a preamble period has expired. In this regard, it should be appreciated that a communication of the data symbols to the channel encoder 216 is delayed by a time defined by the length of the "known data preamble." As should be appreciated, the time delay allows all of a "known data preamble" to be fully communicated to the channel encoder 216 prior to communication of the data symbols.

The channel encoder 216 is configured to perform actions for representing the "known data preamble" and the data symbols in the form of a modulated amplitude-and-time-discrete digital (MATDD) signal. The MATDD signal is defined by digital words which represent baseband modulated symbols comprised of bits of data each having a one (1) value or a zero (0) value. Methods for representing digital symbols as a MATDD signal are well known to persons having ordinary skill in the art. Thus, such methods will not be described herein. However, it should be appreciated that the channel encoder 216 can employ any such method. For example, the channel encoder 216 can be selected as a digital baseband modulator employing quadrature phase shift keying (QPSK). As will be appreciated by those skilled in the art, the output of the QPSK modulator will include an in-phase ("I") data and quadrature phase ("Q") data. In this scenario, the I and Q data is communicated from the channel encoder 216 to the digital complex multiplier 224. Embodiments of the present invention are not limited in this regard.

According to embodiments of the present invention, a sample rate matching device (not shown in FIG. 2) is provided between the channel encoder 216 and the digital complex multiplier 224. The sample rate matching device (not shown in FIG. 2) performs a sample rate increase on the MATDD signal so that a sample rate of the MATDD signal is the same as a digital chaotic sequence communicated to the digital complex multiplier 224. Embodiments of the present invention are not limited in this regard.

Referring again to FIG. 2, the digital complex multiplier 224 performs a complex multiplication in the digital domain. In the digital complex multiplier 224, the MATDD signal is multiplied by a digital representation of a chaotic sequence selected from a plurality of statistically orthogonal chaotic sequences. The plurality of statistically orthogonal chaotic sequences is generated by the sequence generators 240, 242, ..., 244. Complex multiplier 224 is also configured to communicate its output to interpolator 226.

Each of the sequence generators 240, 242, ..., 244 is configured to process a chaotic sequence received from the chaos generator 218 so as to generate a selection of statistically orthogonal chaotic sequences. Each of the sequence generators 240, 242, 244 is configured to communicate these statistically orthogonal chaotic sequences to sequence selector 246. In this regard, it should be understood that each of the sequence generators 240, 242, ..., 244 utilizes a deterministic algorithm configured to preserve the uniform statistics of the chaotic sequence generated at the chaos generator 218 yet ensures that the respective outputs are statistically orthogonal. In this fashion, each of the sequence generators 240, 242, 244 produces a selection of statistically orthogonal communications basis functions. As such, the deterministic algorithms used to produce the statistically orthogonal communications basis functions are herein referred to as basis function algorithms. The chaos generator 218 will be described in detail below in relation to FIGS. 8-10. The basis function algorithms include, but are not limited to, a bijective function, a rotation algorithm in which the bits of a bit word are reorganized (e.g., the first "d" bits become the last "d" bits of the bit word), a scrambling algorithm in which the bits of a bit word are scrambled, an XOR algorithm in which the bits of the bit word are XOR'ed with a known value, and an encryption algorithm (e.g., a Galois extension field multiplication algorithm). The basis function algorithms can also include, but are not limited to, uniform statistics preserving transformations, statistical shaping transformations, time-delayed statistical shaping transformations, and fractal evolution statistical shaping transformations.

The chaotic sequence is selected by the sequence selector 246 from the plurality of statistically orthogonal chaotic sequences generated by the sequence generators 240, 242, ..., 244. This chaotic sequence selection is made utilizing symbol formatted data received from the symbol formatter 206. For example, if the transmitter 102 includes only two (2) sequence generators 240, 242, then a chaotic sequence is selected from a first statistically orthogonal chaotic sequence generated at the sequence generator 240 and a second statistically orthogonal chaotic sequence generated at the sequence generator 242. This chaotic sequence selection is made based on a value of a single bit received from the symbol formatter 206. More particularly, the first statistically orthogonal chaotic sequence is selected if the value of the bit received from the symbol formatter 206 is zero (0). Alternatively, the second statistically orthogonal chaotic sequence is selected if the value of the bit received from the symbol formatter 206 is one (1). Embodiments of the present invention are not limited in this regard.

One or more bits of the symbol formatted data can be utilized by the sequence selector 246 for selecting a chaotic sequence from a plurality of statistically orthogonal chaotic sequences. The number of bits of the symbol formatted data depends on the number of sequence generators 240, 242, ..., 244 employed by the transmitter 102 and the number of chaotic sequences to be selected by the sequence selector 246. For example, the number of bits of the symbol formatted data can be determined by the following mathematical equation (1).

$$NOB = \log(2)D \qquad (1)$$

where NOB represents the number of bits of the symbol formatted data utilized by the sequence selector 246 to select one or more chaotic sequences from a plurality of statistically orthogonal chaotic sequences. "D" represents the number of modulation states of the transmitter 102. "D" can be defined by the following mathematical equation (2).

$$D = B!/[A!(B-A)!] \qquad (2)$$

where "B" represents the number of sequence generators 240, 242, ..., 244 employed by the transmitter 102. "A" represents the number of chaotic sequences to be selected by the sequence selector 246 from a plurality of statistically orthogonal chaotic sequences generated by the "B" sequence generators 240, 242, ..., 244. As such, the number of possible selections by sequence selector 246 is equal to the combinatorial choice of "A" distinct elements from a size "B".

In the embodiment of the present invention shown in FIG. 2, the value of "A" is assumed to be one (1). However, it should be noted that the present invention is not limited in this regard. A more comprehensive description of the operations of the sequence selector 246 for "A" greater then one (1) is described in relation to FIG. 3.

Notably, the combinatorial selection values "D" need not be powers of two (2). The formatting of a symbol formatter 206 and reverse processing at the receiver (described in relation to FIGS. 4A, 4B and 6) into a non-binary format is also included without limitation. For example, choosing B=3 and A=1 allows transmittal of log(2)3 or approximately 1.58 bits of data information per symbol. A sequence of such formatted symbols may be prepared by the symbol formatter 206 such that an integer number of data bits are converted into a non-binary number base. Alternatively, the symbol formatter 206 output may be presented in a mixed-radix format, with conversion to and from an unweighted number system at the transmitter and receiver.

The sequence selector 246 communicates the selected chaotic sequence to the RUQG 220. The RUQG 220 statistically transforms the selected chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, the RUQG 220 can take in two (2) uniformly distributed real inputs from the sequence selector 246 and convert those via a complex-valued bivariate Gaussian transformation to a quadrature output having statistical characteristics of a Gaussian distribution. Such conversions are well understood by those having ordinary skill in the art, and therefore will not be described herein. However, it should be understood that such techniques may use nonlinear processors, look-up tables, iterative processing (CORDIC functions), or other similar mathematical processes. The RUQG 220 is further configured to communicate transformed chaotic sequences to the SRMF 222. If the channel encoder 216 is configured to yield a complex output representation of a data signal, then the transformed chaotic sequence includes an in-phase ("I") data portion and quadrature phase ("Q") data portion. In this scenario, the "I" and "Q" data portions of the transformed chaotic sequence are communicated from the RUQG 220 to the SRMF 222 as shown in FIG. 2. Embodiments of the present invention are not limited in this regard.

According to embodiments of the present invention, the RUQG 220 statistically transforms a selected chaotic sequence into a quadrature Gaussian form thereof. This statistical transformation is achieved via a nonlinear processor that combines lookup tables and embedded computational logic to implement the conversion of two (2) independent uniformly distributed random variables into a quadrature pair of standard normal Gaussian distributed variables. One such structure for this conversion is shown in the mathematical equations (3) and (4).

$$G_1 = \sqrt{2\log(u_1)} \sin(2\pi u_2) \qquad (3)$$

$$G_2 = \sqrt{-2\log(u_1)} \cos(2\pi u_2) \qquad (4)$$

where $\{u_1, u_2\}$ are uniformly distributed independent input random variables drawn from the set (0,1) and $\{G_1, G_2\}$ are Gaussian distributed output random variables with zero mean and unit variance. Embodiments of the present invention are not limited in this regard.

At the SRMF 222, the sample rate of the transformed chaotic sequence is matched to the sample rate of the MATDD signal. In this regard, the SRMF 222 can include, but is not limited to, a real sample rate matching filter. The real sample rate matching filter can be configured to resample "I" and "Q" portions of the transformed chaotic sequence. The SRMF 222 is also configured to communicate a re-sampled, transformed digital chaotic sequence to the digital complex multiplier 224.

The digital complex multiplier 224 performs a complex multiplication on the re-sampled, transformed digital chaotic sequence output from the SRMF 222 and the MATDD signal output from the channel encoder 216. The result of the complex multiplication is a digital representation of a coherent chaotic sequence spread spectrum modulated baseband signal in which the digital data from the channel encoder 216 has been spread over a wide frequency bandwidth in accordance with the selected statistically orthogonal chaotic sequence generated by a sequence generator 240, 242, ..., 244. The result of the complex multiplication is referred to herein as a digitally modulated chaotic communication signal. The digitally modulated chaotic communication signal is communicated from the digital complex multiplier 224 to the interpolator 226.

The interpolator 226, RPCM 228 and LO 230 operate in tandem to form an IF translator which frequency translates a quadrature baseband signal received from the complex multiplier 224 to a second real IF signal. Such digital IF translators are known to those having ordinary skill in the art, and therefore will not be described herein. However, it should be understood that the interpolator 226 raises the sample rate of the digitally modulated chaotic communication signal received from the complex multiplier 224 to a rate compatible with the bandwidth and center frequency of the second IF. The LO 230 generates a complex quadrature amplitude-and-time-discrete digital sinusoid at a frequency which shall translate the first IF to a desired second IF. The LO 230 is also configured to pass its output to the RPCM 228. The RPCM 228 is configured to accept as its inputs the quadrature output of the interpolator 228 and the quadrature output of the LO 230. The RPCM 228 is configured to perform complex multiplication operations using the received signals. The result of the complex multiplication operations is a sampled digitally modulated chaotic communication signal including the real parts of the products of a complex multiplication. The sampled digital modulated chaotic communication signal is communicated from the RPCM 228 to the DAC 232. Notably, the conversion from a baseband signal to an IF signal may be performed in one or multiple stages (as shown in FIG. 2) without limitation. Such architectures are well known to those having ordinary skill in the art, and therefore are not described herein. The DAC 232 converts the sampled digital modulated chaotic communication signal to an analog signal. The analog signal is communicated from the DAC 232 to the anti-image filter 234.

The anti-image filter 234 is configured to remove spectral images from the analog signal to form a smooth time domain signal. The anti-image filter 234 is also configured to communicate a smooth time domain signal to the IF-to-RF conversion device 236.

The IF-to-RF conversion device 236 can include, but is not limited to, a wide bandwidth analog IF to RF up converter (not shown in FIG. 2) and a power amplifier (not shown in FIG. 2). In this regard, the IF-to-RF conversion device 236 is generally configured to center a smooth time domain signal at an RF for transmission thereby forming an RF signal. The power amplifier (not shown in FIG. 2) is configured to amplify the RF signal. The power amplifier (not shown in FIG. 2) is also configured to communicate the amplified RF signal to the antenna element 238 for communication to a receiver (e.g., the receiver 104 shown in FIG. 1).

It should be understood that the digital generation of the digital chaotic sequence at the transmitter 102 and a receiver (e.g., the receiver 104 of FIG. 1) is kept closely coordinated under the control of the PRTR clock 212 (via transmitter controller 210). The higher the precision of the PRTR clock 212, the closer the synchronization of the chaos generator 218 of the transmitter 102 and the chaos generator (e.g., chaos generator 468 shown in FIG. 4A) of the receiver (e.g., the receiver 104 of FIG. 1) shall be excluding the effects of processing delay differences and channel propagation times. The use of the PRTR clock 212 allows the states of the chaos generators to be easily controlled with precision.

The PRTR clock 212 can include, but is not limited to, a stable local oscillator locked to a precision real time reference, such as a GPS clock receiver or a chip scale atomic clock (CSAC). The PRTR clock 212 is configured to supply a high frequency clock to the clocked logic circuits (e.g., components 206, ..., 232) while being locked to a lower frequency reference clock. The lower frequency reference clock supplies a common reference and a common real time of day reference to prevent a large drift between the states of the chaos generator 218 and the chaos generator (e.g., chaos generator 468 shown in FIG. 4A) of the receiver (e.g., the receiver 104 of FIG. 1) over an extended time interval.

A person skilled in the art will appreciate that the transmitter architecture shown in FIG. 2 is one example of an architecture that can be employed by a transmitter 102 of the communication system shown in FIG. 1. Embodiments of the present invention are not limited in this regard. For example, the transmitter 102 can alternatively implement the transmitter architecture shown in FIG. 3.

Figure 3:
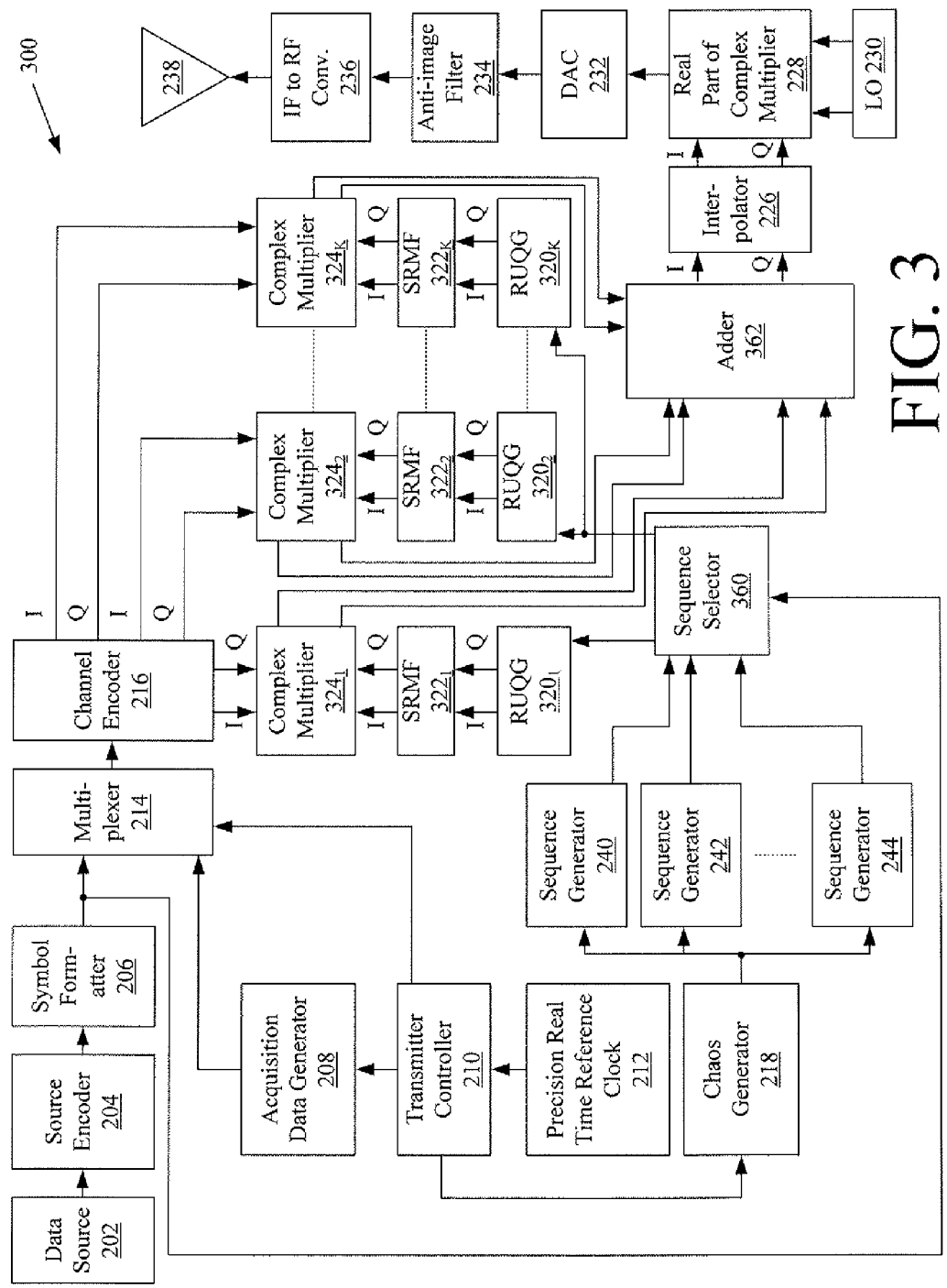
FIG. 3 is a block diagram of a second exemplary embodiment of a transmitter that is useful for understanding the present invention.

Referring now to FIG. 3, the transmitter 300 includes components 202-218, 226-244 which are described above in relation to FIG. 2. The transmitter 300 also includes a plurality of RUQGs $320_1, 320_2, \ldots, 320_K$, a plurality of SRMFs $322_1, 322_2, \ldots, 322_K$ and a plurality of complex multipliers $324_1, 324_2, \ldots, 324_K$. The RUQGs $320_1, 320_2, \ldots, 320_K$ are the same as or similar to the RUQG 220 of FIG. 2. Similarly, the SRMFs $322_1, 322_2, \ldots, 322_K$ are the same as or similar to the SRMF 222 of FIG. 2. Likewise, the complex multipliers $324_1, 324_2, \ldots, 324_K$ are the same as or similar to the complex multipliers 224 of FIG. 2. As such, the discussion provided above in relation to components 220-224 of FIG. 2 is sufficient for understanding the components $320_1, 320_2, \ldots, 320_K, 322_1, 322_2, \ldots, 322_K, 324_1, 324_2, \ldots, 324_K$ of FIG. 3.

The transmitter 300 further includes a sequence selector 360 and an adder 362. The adder 362 is configured to additively combine the signals received from the complex multipliers $324_1, 324_2, \ldots, 324_K$ to form a combined digitally modulated chaotic communication signal. The combined digitally modulated chaotic communication signal is communicated from the adder 362 to the interpolator 226 for subsequent processing. Notably, the transmitter 300 can operate in a staggering mode or delay mode. In the staggering mode or delay mode, the outputs of the complex multipliers $324_1, 324_2, \ldots, 324_K$ are communicated to the adder 362 in a staggered manner and/or sequential manner.

The sequence selector 360 is configured to select "A" chaotic sequences from the plurality of the statistically orthogonal chaotic sequences received from the "B" sequence generators 240, 242, ..., 244. "B" is an integer. "A" is an integer having a value less than or equal to "B". Each of the selected "A" chaotic sequences is communicated from the sequence selector 360 to the respective one of the RUQGs $320_1, 320_2, \ldots, 320_K$. The "A" chaotic sequences are selected by the sequence selector 360 from the plurality of statistically orthogonal chaotic sequences generated at the "B" sequence generators 240, 242, ..., 244. This chaotic sequence selection is made utilizing symbol formatted data received from the symbol formatter 206. For example, if the transmitter 102 includes B=six (6) sequence generators 240, 242, ..., 244, then A=three (3) chaotic sequences can be selected from six (6) statistically orthogonal chaotic sequences generated at the sequence generators 240, 242, ..., 244. This selection optimally follows a combinatorial selection of chaotic sequences based on input data (i.e., symbol formatted data received from the symbol formatter 206). The combinatorial selection is defined by mathematic equations (1) and (2) provided above. The combinatorial selection allows for "6 choose 3" or 20 (i.e., 6!/[3!(6−3)!]=20) possible basis function selections of the transmitter 300. In this scenario, the number of possible modulations states is defined by the number of possible combinations of the plurality of statistically orthogonal chaotic sequences generated by the six (6) sequence generators 240, 242, ..., 244. Also in this scenario, the number of bits of input data utilized by the sequence selector 360 to select the three (3) chaotic sequences is an average of log 2(20) or 4.32 bits. In embodiments of the present invention, the value of "A" is chosen to be a value less than or equal to the value of "B" divided by two (2) since the additive signal shares the total power level transmitted from the transmitter 102 to the receiver 104 of FIG. 1. Embodiments of the present invention are not limited in this regard.

Notably, the selection of the values for "A" and "B" may be dynamically adjusted on up to a symbol-by-symbol basis based on channel conditions. As such, the output of symbol formatter 206 may also communicate controls to sequence selector 360 in order to designate any of the possible "A" and "B" values supported by the transmitter 300 hardware. In particular, the value of "A" is constrained to be less than or equal to the value of "K". As such, mathematical equation (2) may be adjusted as shown in mathematical equation (5) for a fixed "B" greater than or equal to two (2).

$$D = \sum_{A=1}^{floor(B/2)} \frac{B!}{A!(B-A)!} \quad (5)$$

For an adjustable "B" less than "2K", mathematical equation (5) may be further adjusted as shown in mathematical equation (6).

$$D = \sum_{B=2}^{H} \sum_{A=1}^{floor(B/2)} \frac{B!}{A!(B-A)!} \quad (6)$$

where "H" is the number of sequence generators 240, 242, ..., 244. Note that floor(x) represents the "floor" function, which is equal to the integer portion of the argument "x" for positive arguments. For example, if "H" equals eight (8) and "K" is at least four (4), then the total possible number of ordered sequence selections is D=296. In practice, this set of possible combinations may be intentionally reduced without limitation.

Embodiments of Receiver Architectures

Figure 4A:
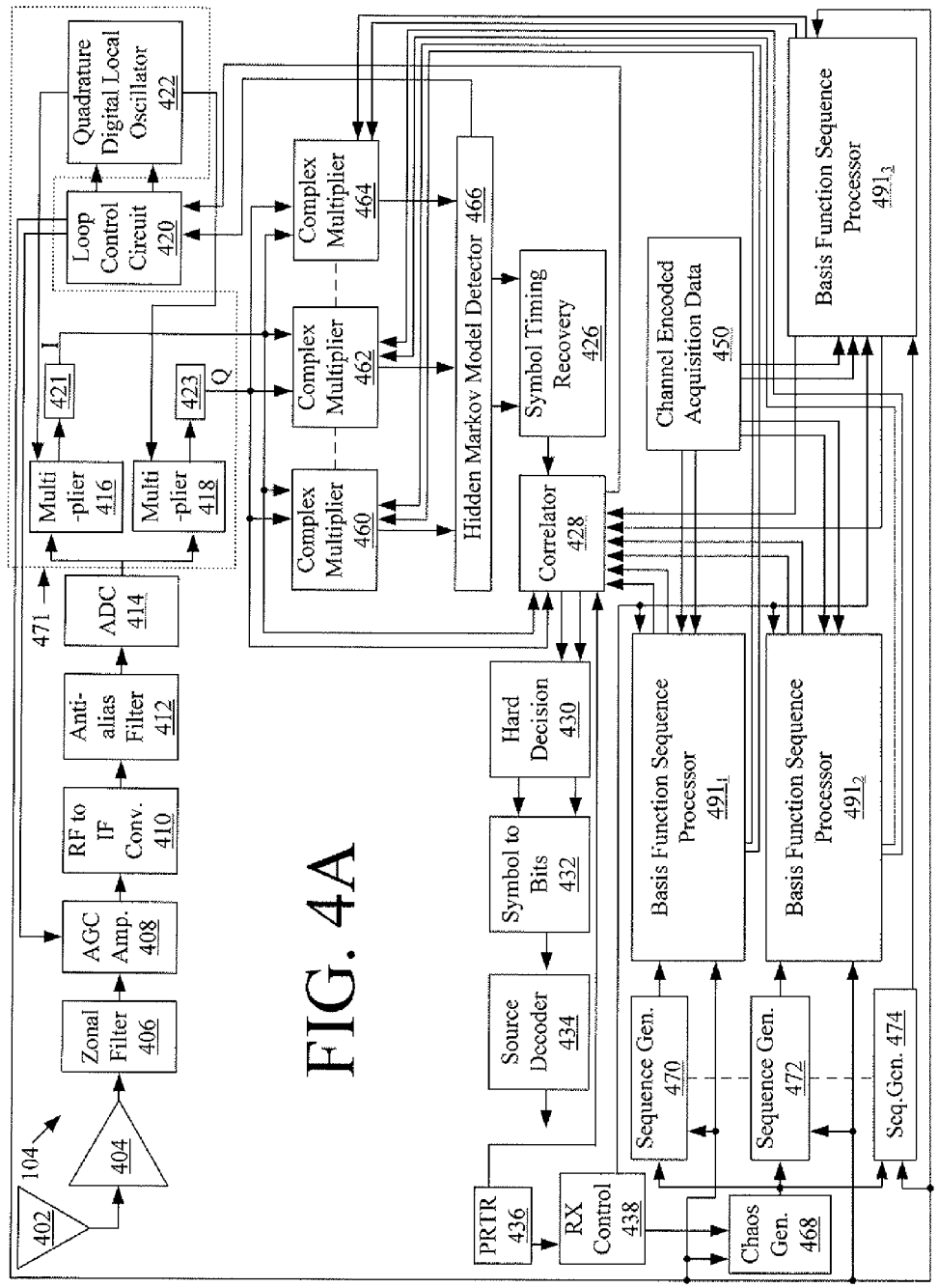
FIG. 4A is a block diagram of a first embodiment of a receiver that is useful for understanding the present invention.
Figure 4B:
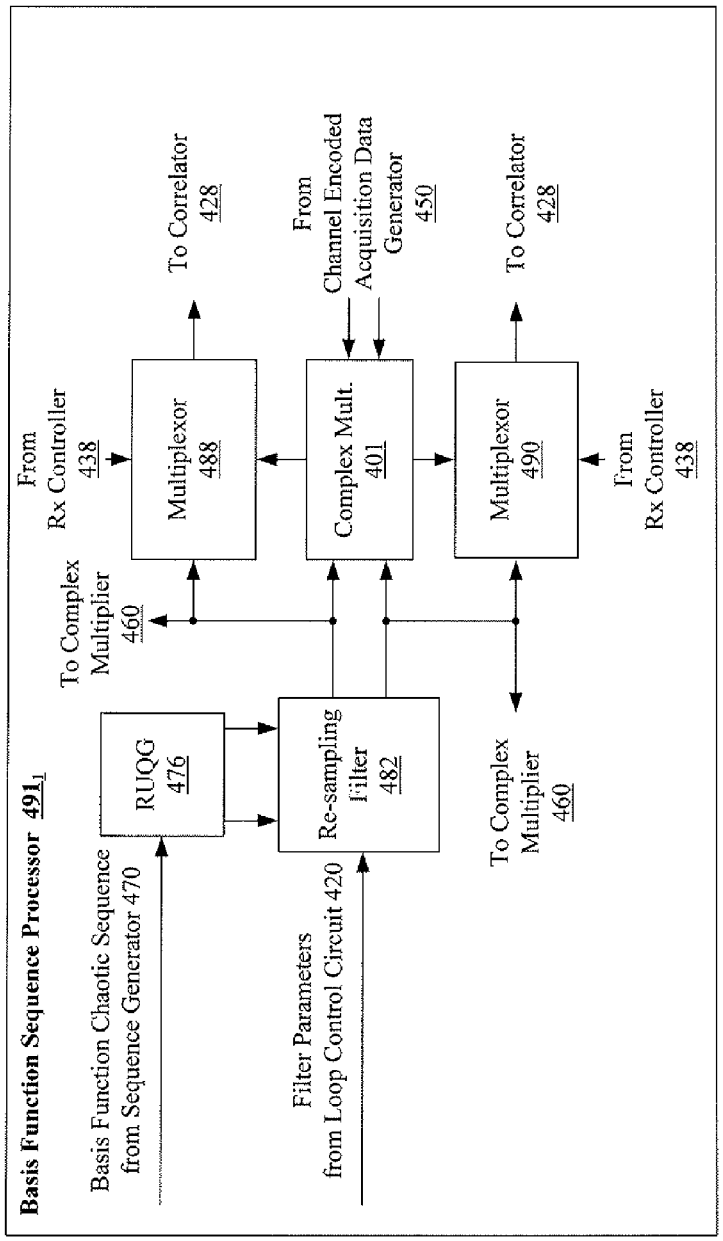
FIG. 4B is a block diagram of a basis function sequence processor shown in FIG. 4A.
Figure 6:
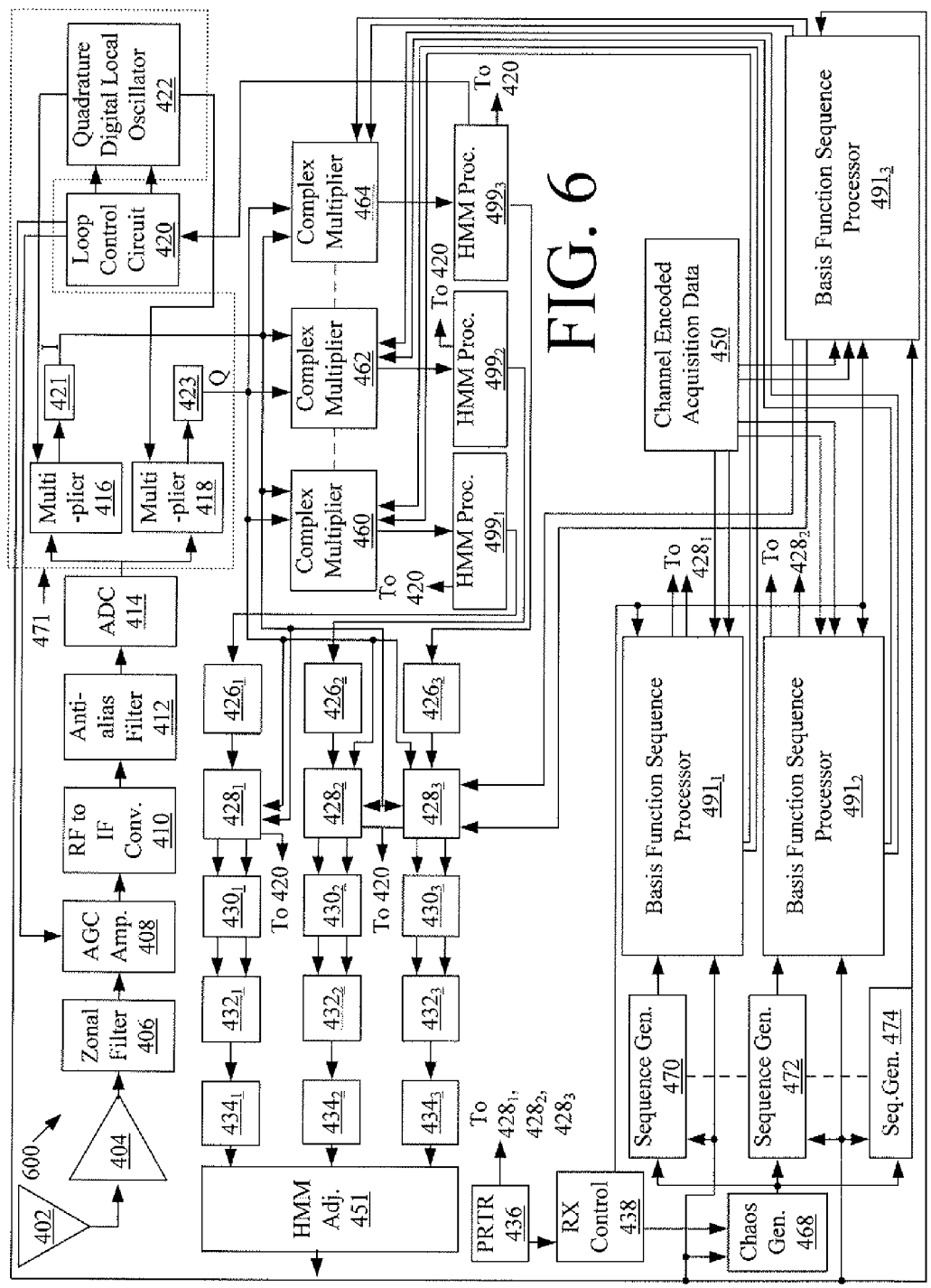
FIG. 6 is a block diagram of a second embodiment of a receiver that is useful for understanding the present invention.

Referring now to FIGS. 4A-4B, there is provided a block diagram of an exemplary embodiment of the receiver 104 shown in FIG. 1 that is useful for understanding the present invention. It should be noted that, in conventional analog based coherent communications systems, analog chaos circuits are synchronized by periodically exchanging state information. The exchange of state information requires a substantial amount of additional bandwidth. This is what makes analog based coherent communications impracticable.

The receiver 104 of FIGS. 4A-4B is designed to eliminate the drawbacks of conventional analog based coherent communications systems. In this regard, it should be appreciated that the receiver 104 includes a digital chaos generator 468. The receiver 104 includes a tracking loop for synchronizing its digital chaos generator 468 and the digital chaos generator 218 of the transmitter 102. Most significantly, the receiver 104 is configured to synchronize a plurality of strings of discrete time chaotic samples (i.e., chaotic sequences) without using a constant or periodic transfer of state update information. As a result, the receiver utilized coherent reception techniques equivalent to matched filter reception. A first set of discrete time chaotic sample strings is generated at the transmitter 102. An identical second set of discrete time chaotic sample strings is generated at the receiver 104.

Referring again to FIGS. 4A-4B, the receiver 104 is comprised of an antenna element 402, a low noise amplifier (LNA) 404, a zonal filter 406, an AGC amplifier 408, an RF-to-IF conversion device 410, an anti-alias filter 412 and an A/D converter 414. The receiver 104 is also comprised of real multipliers 416, 418, a loop control circuit 420, a quadrature digital LO 422, a correlator 428, a Channel Encoded Acquisition Data Generator (CEADG) 450, digital complex multipliers 460, 462, 464, a Hidden Morkov Model (HMM) detector 466 and a symbol timing recovery circuit 426. The receiver 104 is further comprised of a receiver controller 438, a PRTR 436, a hard decision device 430, a Symbol to Bits (S/B) converter 432 and a source decoder 434. The receiver 104 is comprised of a chaos generator 468, sequence generators 470, 472, 474, lowpass filters 421, 423, and basis function sequence processors $491_1$, $491_2$, $491_3$. Each of the above listed components and circuits 402-418, 421-428, 430-438, 450 and 460-464 are well known to persons skilled in the art. Thus, these components and circuits will not be described in detail herein. However, a discussion of the receiver 104 architecture is provided to assist a reader in understanding the present invention.

Referring again to FIG. 4A, the antenna element 402 is configured to receive an analog input signal communicated from a transmitter (e.g., transmitter 102 of FIG. 1) over a communications link. The antenna element 402 is also configured to communicate the analog input signal to the LNA 404. The LNA 404 is configured to amplify a received analog input signal while adding as little noise and distortion as possible. The LNA 404 is also configured to communicate an amplified, analog input signal to the zonal filer 406. The zonal filter 406 is an analog filter with a slow roll off characteristic, but low injection loss. The zonal filter 406 is configured to suppress large interfering signals outside of the bands of interest. The zonal filter 406 is also configured to communicate a filtered, analog input signal to the AGC amplifier 408.

The AGC amplifier 408 is a controllable gain amplifier configured to keep the magnitude of the received signal within normal bounds for the rest of the signal processing chain. In this regard, the AGC amplifier 408 is configured to communicate a gain adjusted, analog input signal to the RF-to-IF conversion device 410.

The RF-to-IF conversion device 410 is configured to mix the analog input signal to a preferred IF for conversion to a digital signal at the A/D converter 414. The RF-to-IF conversion device 410 is also configured to communicate a mixed analog input signal to the anti-alias filter 412. The anti-alias filter 412 is configured to restrict a bandwidth of a mixed analog input signal. The anti-alias filter 412 is also configured to communicate a filtered, analog input signal to the A/D converter 414. The A/D converter 414 is configured to convert a received analog input signal to a digital signal. The A/D converter 414 is also configured to communicate a digital input signal to an IF translator 471. The IF translator 471 is generally configured to mix the digital input signal to a preferred IF for processing at the digital complex multipliers 460, 462, 464 and correlator 428. As such, the IF translator 471 is comprised of the real multipliers 416, 418, lowpass filters 421, 423 and the LO 422. In embodiments of the present invention, the IF translator is configured to convert the digital input signal to a zero IF, or baseband signal.

The multiplier 416 is configured to receive a digital word as input from the A/D converter 414 and a digital word from the in-phase component of the LO 422. The multiplier 416 multiplies the output of the A/D converter 414 by the in-phase component of the LO 422. The digital output word is then communicated from the multiplier 416 to the lowpass filter 421. Similarly, the multiplier 418 is configured to receive a digital word as input from the A/D converter 414 and a digital word from the quadrature-phase component of the LO 422. The multiplier 418 multiplies the output of the A/D converter 414 by the quadrature-phase component of the LO 422. The digital output word is then communicated from the multiplier 418 to the lowpass filter 423. Notably, the lowpass filters 421 and 423 are identical digital lowpass filters which pass one sideband of the baseband IF signal while attenuating the other sideband. This has the effect of forming a quadrature form of the IF signal at the output of the IF translator 471.

The LO 422 generates a complex quadrature amplitude-and-time-discrete digital sinusoid at a frequency which translates the first IF to baseband and remove detected frequency and phase offsets in the resulting quadrature baseband signal. The LO 422 accepts as its inputs a binary phase control word and a binary frequency control word from the loop control circuit 420.

As noted above, the IF translator 471 is configured to mix the digital input signal to a preferred IF for processing at the digital complex multipliers 460, 462, 464 and correlator 428. The IF translator 471 is also configured to communicate a digital input signal to the digital complex multipliers 460, 462, 464 and correlator 428. As will be appreciated by those having ordinary skill in the art, the output of the IF translator 471 can include an in-phase ("I") data and quadrature phase ("Q") data. As such, the IF translator 471 can communicate I and Q data to the digital complex multipliers 460, 462, 464 and correlator 428.

Each of the digital complex multipliers 460, 462, 464 is configured to perform a complex multiplication in the digital domain. Although three (3) digital complex multipliers 460, 462, 464 are shown in FIG. 4A, embodiments of the present invention are not limited in this regard. The receiver 104 can include any number of digital complex multipliers suitable for a particular application. For example, the receiver 104 can have the same number of digital complex multipliers as the number of sequence generators (e.g., sequence generators 240, 242, 244 of FIG. 2) employed by the transmitter (e.g., the transmitter 102 of FIG. 1), "H". In this scenario, the receiver 104 generally de-spreads a digital input signal received from the IF translator 471 using replicas of the statistically orthogonal chaotic sequences generated at the transmitter (e.g., the transmitter 102 of FIG. 1). The de-spreading of the digital input signal is accomplished by the digital complex multipliers 460, 462, 464. More particularly, in each of the digital complex multipliers 460, 462, 464, the digital input signal is multiplied by a digital representation of a respective statistically orthogonal chaotic sequence. The results of the multiplication operations are communicated from the digital complex multipliers 460, 462, 464 to the HMM detector 466.

The HMM detector 466 is generally configured to utilize an HMM to select one of the observation signals on a symbol-by-symbol basis. HMMs are well known to persons skilled in the art, and therefore will not be described in detail herein. However, it should be understood that the selected observations are the signal(s) that the HMM detector 466 determines were transmitted from the transmitter (e.g., transmitter 102 of FIG. 1). This determination can generally be made by: (a) calculating or determining correlation values for the observation signals; (b) identifying the correlation value that has the highest value of the values of the calculated correlation values; (c) and utilizing the identified correlation value in a deterministic process to determine that the observation signal associated with the identified correlation value represents the signal transmitted from the transmitter. The correlation values can be defined by the magnitudes and phases of symbols of the observation signals, respectively. The deterministic process can include, but is not limited to, an HMM deterministic process, a decision tree based deterministic process and/or a fractal evolution based deterministic process. The selected observation signal is(are) then communicated from the HMM detector 466 to the loop control circuit 420 for utilization in at least one phase, frequency and time tracking loop of the receiver 104. The observation signal communicated from the HMM detector 466 to the loop control circuit 420 can also be used to adjust the sequence generator 470, 472, 474 parameters in order to support a time or state dependant evolution to the receiver 104 processing. The selected observations are also communicated from the HMM detector 466 to the symbol timing recovery circuit 426 for subsequent processing. The HMM detector 466 will be described in more detail below in relation to FIG. 5.

The statistically orthogonal chaotic sequences are generated by the sequence generators 470, 472, 474. Although three (3) sequence generators 470, 472, 474 are shown in FIG. 4A, embodiments of the present invention are not limited in this regard. The receiver 104 can include any number of sequence generators suitable for a particular application. For example, the receiver 104 can include the same number of sequence generators 470, 472, 474 as the number of sequence generators (e.g., sequence generators 240, 242, 244 of FIG. 2) employed by the transmitter (e.g., the transmitter 102 of FIG. 1), "H".

Each of the sequence generators 470, 472, 474 is configured to process a chaotic sequence received from the chaos generator 468 so as to generate a statistically orthogonal chaotic sequence. Notably, the chaos generator 468 is controlled by the receiver controller 438 so that it generates a chaotic sequence with the correct initial state when the receiver 104 is in an acquisition mode and a tracking mode. Acquisition and tracking modes of receivers are well known to those having ordinary skill in the art, and therefore will not be described herein.

Each of the sequence generators 470, 472, 474 utilizes a basis function algorithm configured to preserve the uniform statistics of the chaotic sequence generated at the chaos generator 468. The chaos generator 468 will be described in detail below in relation to FIGS. 8-10. Notably, the sequence generators 470, 472, 474 can utilize the same or different basis function algorithms. The basis function algorithm(s) can be selected to ensure that the outputs of the sequence generators 470, 472, 474 are statistically orthogonal chaotic sequences. The basis function algorithms include, but are not limited to, bijective functions, rotation algorithms in which the bits of bit words are reorganized (e.g., the first "d" bits become the last "d" bits of the bit word), scrambling algorithms in which the bits of bit words are scrambled, XOR algorithms in which the bits of bit words are XOR'ed with known values, and encryption algorithms (e.g., a Galois extension field multiplication algorithm). The basis function algorithms can also include, but are not limited to, uniform statistic preserving transformations, statistical shaping transformation, time-delayed shaping transformations, and fractal evolution statistical shaping transformations. Notably, the basis functions and/or parameters of one or more of the basis function algorithms utilized by the sequence generators 470, 472, 474 can change as a function of time. In this scenario, the loop control circuit 420 can communicate with the sequence generators 470, 472, 474 for updating the basis functions and/or parameters at particular times.

For example, in one embodiment of a fractal evolution statistical shaping transformation, the transmitter 102 of FIG. 1 will adjust the basis functions and/or parameters of sequence generators 240, 242, 244 shown in FIG. 2 via controls from the transmitter controller 210 (connections not shown in FIG. 2). These changes in basis function parameters are data dependent, shown as the formatted data communicated from the symbol formatter 206 to sequence selector 246 of FIG. 2. As large amounts of data are transmitted, the possible range of basis function parameters is extremely large, helping ensure that the evolution of resulting chaotic basis function helps embed the history of communicated data. The downside of this evolution is that the search space grows exponentially as the string of unknown symbols increases. In a specific implementation of this embodiment, the basis function parameters in sequence generators 240, 242, 244 are adjusted after each data symbol. The receiver processing as shown in FIG. 4 duplicates the evolution of sequence generator 470, 472, 474 parameters based on receiver processing of the received chaotic communication signal. If the receiver has the capability to perform processing on a signal in non-realtime, then the received signal may be processed using a distinct subset of all possible parameter evolutions, narrowing the search space quickly when symbols are received correctly. However, the present invention is not limited in this regard.

Each of the sequence generators 470, 472, 474 communicates a statistically orthogonal chaotic sequence to a respective basis function sequence processor $491_1$, $491_2$, $491_3$. A detailed block diagram of the basis function sequence processor $491_1$ is provided in FIG. 4B. The basis function sequence processor $491_2$, $491_3$ are the same as or similar to the basis function sequence processor $491_1$. As such, the following discussion of the basis function sequence processor $491_1$ is sufficient for understanding the basis function sequence processor $491_2$, $491_3$.

As shown in FIG. 4B, the basis function sequence processor $491_1$ includes an RUQG 476, a re-sampling filter 482, multiplexors 488, 490 and a complex multiplier 401. The RUQG 476 is generally configured to statistically transform a statistically orthogonal chaotic sequence into a transformed chaotic sequence. The transformed chaotic sequence can have a characteristic form including combinations of real, complex, or quadrature, being of different word widths, and having different statistical distributions. One such statistical transformation is a bivariate Gaussian distribution that converts two (2) independent uniformly distributed random variables to a pair of quadrature Gaussian distributed variables. The RUQG 476 is further configured to communicate a transformed chaotic sequence to the re-sampling filter 482.

The re-sampling filter 482 is a filter configured for adjusting the digital sample times of the statistically transformed chaotic sequence provide by the RUQG 476. In particular, the re-sampling filter 482 is configured to compensate for transmit and receive clock offsets with less than a certain level of distortion when the receiver 104 is in a steady state demodulation mode. The amplitude-and-time discrete chaotic sequence represents a periodic sampling of a continuous waveform. The re-sampling filter 482 adjusts the periodic rate that samples are taken from the notional continuous waveform to compensate for transmit and receive clocks offsets and drifts. In this regard, it should be appreciated that the re-sampling filter 482 is configured to convert a sampling rate of in-phase ("I") and quadrature-phase ("Q") data sequences from a first sample set to a second sample set without changing the spectrum of the data contained in therein. The re-sampling filter 482 is further configured to communicate in-phase ("I") and quadrature-phase ("Q") data sequences to complex multipliers 401, 460 and multiplexors 488, 490.

The digital complex multiplier 401 generally performs a complex multiplication in the digital domain using a modulated acquisition sequence received from the CEADG 450 of FIG. 4A. This complex multiplication includes multiplying the modulated acquisition sequence by a digital representation of a transformed chaotic sequence to yield a reference for a digital input signal. The reference signal is communicated from the digital complex multiplier 401 to multiplexers 488, 490.

The multiplexer 488 is configured to route the quadrature-phase part of a reference signal to the correlator 428 of FIG. 4A. The multiplexer 490 is configured to route the in-phase part of a reference signal to the correlator 428. In this regard, it should be appreciated that the multiplexers 488, 490 are coupled to the receiver controller 438 of FIG. 4A. The receiver controller 438 is configured to control the multiplexers 488, 490 in tandem so that the multiplexers 488, 490 route the reference signal to the correlator 428 while the receiver 104 is in an acquisition mode.

Referring again to FIG. 4A, the correlator 428 correlates a locally generated statistically orthogonal chaotic sequence with a digital input signal. This correlation is performed at a symbol rate on symbol boundaries or at a symbol rate offset from symbol boundaries. As should be understood, a "symbol rate" is a bit rate divided by the number of bits transmitted in each symbol. The symbol rate is measured in symbols-per-second. The phrase "symbol boundary", as used herein, refers to a beginning of a symbol and an end of a symbol.

Notably, the sense of the real and imaginary components of the correlation is directly related to the values of the real and imaginary components of the symbols of a digital input signal. The sense of the real and imaginary components of the correlation can be directly related to the values of the real and imaginary components of the PSK symbols of a digital input signal. Thus, when the correlator 428 is in a steady state demodulation mode, the output of the correlator 428 is PSK symbol soft decisions. In this regard, it should be appreciated that soft information refers to soft-values (which are represented by soft-decision bits) that comprise information about the symbols contained in a sequence. In particular, soft-values are values that represent the probability that a particular symbol in a sequence is an estimate of its ideal value(s). For example, if a binary symbol is a BPSK symbol, then a soft-value for a particular bit can indicate that a probability of a bit being a one (1) is p(1)=0.3. Conversely, the same bit can have a probability of being a zero (0) which is p(0)=0.7. Notably, any such amplitude-and-time discrete modulation type may be used without limitation.

The correlator 428 is also configured to communicate soft decisions to the hard decision device 430 for final symbol decision making. The hard decision device 430 is configured to process the soft decisions to form hard symbol decision and communicate the hard symbol decisions to the S/B converter 432. The S/B converter 432 converts symbols to a binary form. The binary data sequence is communicated from the S/B converter 432 to the source decoder 434. The source decoder 434 decodes FEC applied at the transmitter and communicates the decoded bit stream to one or more external devices (not shown) utilizing the decoded data.

The correlator 428 is also configured to acquire initial timing information associated with a basis function chaotic sequence, to acquire initial timing associated with a data sequence, and to track phase and frequency offset information between the basis function chaotic sequence and a digital input signal. The correlator 428 is also configured to track input signal magnitude information between the basis function chaotic sequence and a digital input signal. Various methods for acquisition of initial timing information and tracking of input signal magnitude, phase and frequency offset information are known by persons having ordinary skill in the art. Any such method can be used with the present invention without limitation.

Referring now to FIG. 5, there is provided a more detailed block diagram of the HMM detector 466 described above in relation to FIGS. 4A-4B. In general, the HMM detector 466 is configured to utilize an HMM to process the observations 550, 552, 556 received from complex multipliers 460, 462, 464 of the receiver 104. HMMs are well known to persons having ordinary skill in the art, and therefore will not be described in detail herein. However, a brief description is provided to facilitate a discussion with respect to the HMM detector 466.

HMMs are generally constructed to quantify the observation probabilities of a traditional Markov process with states that are only observable via a secondary process. Traditional Markov processes are well known to persons having ordinary skill in the art, and therefore will not be described in detail herein. However, it should be understood the memoryless property of a Markov process allows accurate prediction of the probabilities of entering all future states given an initial state and set of initial state probabilities. Transitions between states follow a set of state transition probabilities, allowing calculation of future state probabilities as conditional probabilities of the state transition probabilities and the current state. An HMM is abstracted from the traditional Markov process by observing only a probabilistically dependant characteristic or observation of a hidden state in the traditional Markov process with decisions based on these observations of the secondary probabilistic process.

As it pertains to the present discussion of the HMM detection in a chaotic communication system, the underlying Markov process may be viewed as the last received data symbol (a "state") that may or may not be known with certainty. The potential lack of certainty derives from signal perturbations that occur during transmission through a wireless communications medium. Each data symbol, or Markov model state, is known to occur with a fixed probability given the previous state of the system. The quantifiable HMM observation is the result of the received signal at the receiver 104 after internal signal processing, namely de-spreading of a chaotic spreading sequence. This observation is perturbed from the original state (data symbol) transmitted by the transmitter 102 by additive noise and other signal perturbations that are common in the wireless transmission of data. Each observation is compared to an expected set of observations to derive a prediction of the overall observation sequence. Notably, the expected set of observations may be time-varying or state-dependant. The states of the underlying Markov process can also adapt based on the history of data transmitted. Based on a sequence of these observations, the HMM detector 466 is capable of resolving which data symbols were transmitted, possibly inferring non-detected state transitions from the overall sequence of observations.

In embodiments of the present invention, the transmitter 102 precedes data transmission by transmitting an a priori known preamble to facilitate reception of the data at the receiver 104. This known sequence of transmitted symbols may be used as a training sequence for the HMM detector 466, allowing real-time adaption of the expected observation set based on comparison of the known Markov states and detected observations. Subsequent decisions of transmitted data are interpreted based on known state transition probabilities and subsequent observations. Embodiments of the present invention are not limited in this regard.

The preceding description gives one simple interpretation of an HMM as applied to a communication system. However, it should be understood that any HMM process may be used without limitation. To provide further understanding of the application of an HMM detector 466 to a chaotic communication system, a brief example of one embodiment of the present invention is presented. Still, it should be understood that the present invention is not limited by this description.

As described with respect to FIG. 3, a first chaotic communications transmitter 300 is configured to adapt a chaotic spreading sequence or communication basis functions on a symbol-by-symbol basis. A simple method to ensure that the signal adapts is to choose the basis functions in a manner so that the basis functions do not repeat during any reasonable interval. In this regard, sequence generators 240, 242 are configured to adapt their parameters based on each of the preceding data symbols. If each data symbol represents a binary selection (one data bit), then the sequence generator 240 will adapt its next selection of a basis function derived from the chaos generator 218 output to one (1) of two (2) suitably orthogonal spreading sequences. The next interval will produce a selection between two (2) new suitably orthogonal spreading sequences derived from the time-varying output of chaos generator 218. Notably, the parameter modification in sequence generators 240, 242 occurs independently such that no appreciable correlations will exist between the two (2) collected spreading sequences. Methods for adapting the sequence generator 240, 242 parameters in time to produce sequences with similar statistical distributions are obvious to those having ordinary skill in the art.

By adapting the parameters of sequence generators 240, 242 on a symbol-by-symbol basis, the current parameter state of sequence generators 240, 242 depends on the recent history of data symbols, representing an exponential growth in possible states. Since the number of states in a digital system is necessarily finite, a reduced set of states may be constructed and combined algebraically in a manner similar to a trellis coding format. An example of this method is a 1024-state system represented by ten (10) binary values. At the next symbol interval, the next data symbol is used to update one (1) binary value in the representation, which is then used to define one (1) of 1024 states of the parameters used in sequence generators 240, 242. The next data symbol is used to update the next binary value in the representation, which is in turn used to define another one of the 1024 possible states (possibly the same state).

At the communications receiver 104, the chaotically spread communication signal is processed using a series of coherent de-spreading sequences generated by sequence generators 470, 472. The number of de-spreading sequences defines the number of possible states of the sequence generators 240, 242 during the current symbol interval. The observation signals are processed by the HMM detector 466 to detect a series of observations. The HMM detector 466 then makes a decision based on the series of observations. For example, the HMM detector 466 makes soft symbol decisions based on the previous ten (10) observations and their probabilities of occurrence given the history of observations. Notably, the selected observation length may be chosen at the receiver based on channel conditions, thereby improving computational efficiency at relatively high signal-to-noise ratios.

As shown in FIG. 5, the HMM detector 466 includes a plurality of HMM processors 502, 504, 506 and an HMM adjudicator 508. Each of the HMM processors 502, 504, 506 is generally configured to calculate or determine a correlation value for the respective observation signal 550, 552, 554. The correlation value can be defined by the magnitude and phase of a symbol of the respective observation signal 550, 552, 554. The correlation values computed or determined by the HMM processors 502, 504, 506 are communicated to the HMM adjudicator 508. Each of the HMM processors 502, 504, 506 is also generally configured to estimate a probability that a candidate symbol was received during a symbol interval as well as other potential signal metrics. The candidate symbol is chosen from an a priori known set of possible symbols (possibly time-varying symbols) consistent with the coherent chaotic de-spreading sequence routed to the preceding complex multiplier 460, 462, 464. The estimated symbol probability and signal metrics determined by the HMM processors 502, 504, 506 are communicated to the HMM adjudicator 508.

At the HMM adjudicator 508, the correlation values are compared against each other to identify which correlation value is the largest thereof. The identified correlation value is used by the HMM adjudicator 508 in a deterministic process to determine that the observation signal associated therewith represents the signal transmitted from a transmitter (e.g., transmitter 102 of FIG. 1). The deterministic process can include, but is not limited to, a decision tree based deterministic process and/or a trellis diagram based deterministic process. If the observation signal associated with the identified correlation value is determined to represent the signal transmitted from the transmitter, then it is communicated from the HMM adjudicator 508 to demodulation circuitry (e.g., components 426-434 of FIGS. 4A-4B). If the observation signal associated with the identified correlation value is determined not to represent the signal transmitted from the transmitter and a transmitted signal was expected from the transmitter, then the HMM adjudicator 508 extends its search to a greater duration of observations to attempt improvement in the transmitted signal detection. This process continues recursively until a symbol that represents an expected data evolutionary pattern is located. After such a symbol is located, the HMM adjudicator 508 communicates the located symbol to demodulation circuitry (e.g., symbol timing recovery device 426 of FIG. 4A) and/or the phase, frequency and tracking loop circuitry (e.g., Loop Control Circuit 420 of FIG. 4A). If the HMM adjudicator 508 is unable to locate a symbol that represents an expected data evolutionary pattern, then the HMM adjudicator 508 communicates information indicating the inability to locate the symbol to the phase, frequency and tracking loop circuitry (e.g., Loop Control Circuit 420 of FIG. 4A). At the phase, frequency and tracking loop circuitry (e.g., Loop Control Circuit 420 of FIG. 4A), a determination is made as to whether to reacquire the signal transmitted from the transmitter.

In some embodiments of the present invention, the observation signal associated with the identified correlation value is also communicated from the HMM adjudicator 508 to phase, frequency and tracking loop circuitry (e.g., Loop Control Circuit 420 of FIG. 4A). Alternatively, in a pilot tone tracking scenario, a pre-designated one of the observation signals is communicated from the HMM adjudicator 508 to phase, frequency and tracking loop circuitry (e.g., Loop Control Circuit 420 of FIG. 4A). Various method of pilot tone tracking for communication systems are well known to those having ordinary skill in the art, and therefore will not be described herein. Any such pilot tone tracking method can be used with the present invention without limitation. Notably, such pilot tone tracking methods typically allow a signal from one of the de-spreading channels to be designated as a tracking signal. In this scenario, power and integration interval adjustment can be easily integrated into a channel selection/optimization algorithm implemented in the receiver 104. Consequently, radio cognition can be provided in the pilot tone tracking scenario.

It should be understood that conventional HMM adjudicators typically employ Viterbi algorithms. Viterbi algorithms are constrained to relatively small sizes based on the communication system configuration (e.g., encoding polynomial lengths and finite field sizes). In contrast, the HMM adjudicator 508 of the present invention is limited only by the chaotic spreading sequence length, which is practically infinite and efficiently extendable. Moreover, the chaotic sequence is a maximal entropy spreading sequence with impulsive autocorrelation, thereby ensuring that different data sequences will produce signals with fractional evolutionary patterns.

The following example is provided to demonstrate a fractal evolutionary pattern of a communication system of the present invention. In this example, the communication system receives two (2) data sequences "DS1" and "DS2". The data sequence "DS1" comprises the following ten (10) bits of data {0 1 0 1 0 1 0 1 0 1}. The data sequence "D2" comprises the following ten (10) bits of data {0 1 0 0 0 1 0 1 0 1}. Notably, each bit of the data sequences "DS1" and "DS2" indicates a binary evolution of a data signal. If two (2) chaotic data signals are constructed using the data bits of data sequence "DS1" and "DS2", then a first modulated chaotic data signal associated with data sequence "DS1" correlates with a second modulated chaotic data signal associated with data sequence "DS2" for the first three (3) symbols. The fourth data symbol is different between "DS1" and "DS2", forcing the two (2) spreading sequences to diverge into different evolutionary patterns. The remaining six (6) data symbols of the first and second modulated chaotic data signals are identical, yet the resulting modulated signals are orthogonal with respect to each other. In effect, an exponential growth in the number of possible observations occurs at the receiver, with any change in data symbol creating a new evolutionary path. A linear time search of the observations allows the receiver to detect where evolutionary transitions occur, corresponding to updated data symbols, based on preceding values. Consequently, the HMM based process employed by the receiver is efficient.

It should be emphasized that, in poor signal environments, conventional Viterbi based processes irretrievably fail once a signal misses a number of symbols greater than its encoding polynomial order. In contrast, the HMM based process of the present invention allows a potential for further correction at the expense of greater receiver processing. Therefore, the HMM based process is particularly valuable for communication application employing short bursts of high value data, since the total energy required to digitally process the received signal can be significantly lower than that of re-transmitting the signal through an RF amplifier. Further, the battery constraints of communication systems employing the HMM based process of the present invention are improved as compared to that of conventional communication systems by implementing asymmetric processing.

A person skilled in the art will appreciate that the architecture of receiver 104 shown in FIGS. 4A-5 is one example of an architecture for a communications system receiver. Embodiments of the present invention are not limited in this regard. Any other receiver architecture can be used without limitation. For example, another exemplary architecture 600 for a communication system receiver is provided in FIG. 6.

The receiver 600 generally employs a plurality of demodulator circuits and fly-wheeled tracking loops. Each of the demodulator circuits comprises a symbol timing recovery circuit $426_1$, $426_2$, $426_3$, a correlator $428_1$, $428_2$, $428_3$, a hard decision device $430_1$, $430_2$, $430_3$, an S/B converter $432_1$, $432_2$, $432_3$ and a source decoder $434_1$, $434_2$, $434_3$. Each of the fly-wheeled tracking loops comprises components 408-423, $426_1$, $426_2$, $426_3$, $428_1$, $428_2$, $428_3$, a complex multiplier 460, 462, 464 and an HMM processor $499_1$, $499_2$, $499_3$. Fly-wheeled tracking loops are well known to persons skilled in the art, and therefore will not be described in detail herein. However, it should be understood that there are multiple instantiations of the tracking loops. Each tracking loop corresponds to a possible evolution of the chaotic basis function. Each tracking loop is updated based on the output of its corresponding complex multiplier 460, 462, 464 and HMM processor $499_1$, $499_2$, $499_3$ if a signal is detected. When a signal is not detected, the particular tracking loop extrapolates the last received results to "fly-wheel" the loop parameters during a next symbol interval. This "fly-wheel" of loop parameters allows the particular tracking loop to reject spurious data.

Embodiments of Methods for Processing Data Signals

Referring now to FIG. 7, there is provided a flow diagram of an exemplary method 700 for processing data signals in a communication system (e.g., the communication system 100 of FIG. 1) that is useful for understanding the present invention. The method 700 generally involves generating a spread spectrum signal at a transmitter (e.g., the transmitter 102 of FIG. 1). The spread spectrum signal is then communicated from the transmitter to a receiver (e.g., the receiver 104 of FIG. 1). At the receiver, the spread spectrum signal is processed to obtain data therefrom.

As shown in FIG. 7, the method 700 begins with step 702 and continues with step 704. In step 704, a first chaotic sequence is generated at the transmitter (e.g., the transmitter 102 of FIG. 1) of a first communication device (e.g., a radio console or a handheld radio). Next, step 706 is performed. In step 706, basis function algorithms are performed using the chaotic sequence to generate first statistically orthogonal chaotic sequences. The basis function algorithms can include, but are not limited to, bijective functions, rotation algorithms, scrambling algorithms, XOR algorithms and encryption algorithms. The basis function algorithms can also include, but are not limited to, uniform statistics preserving transformations, statistical shaping transformations, time-delayed statistical shaping transformations and fractal evolution statistical shaping transformations.

After completing step 706, step 708 is performed where at least one chaotic sequence is selected from the first statistically orthogonal chaotic sequences for combining with a data signal. This selection can be based on at least one bit value of symbol formatted data. The symbol formatted data can be obtained by processing a data signal received at the transmitter from a data source. In a next step 710, the selected chaotic sequence is combined with the data signal to obtain a modulated chaotic communication signal with a wide frequency bandwidth. Thereafter, step 712 is performed where the modulated chaotic communication signal is transmitted to the receiver of a second communication device (e.g., a radio console or a handheld radio).

The modulated chaotic communication signal is received at the receiver in step 714. At the receiver, the received modulated chaotic communication signal is processed to obtain data therefrom. This processing generally involves performing steps 716-722 of FIG. 7A and steps 724-744 of FIG. 7B.

Figure 7A:
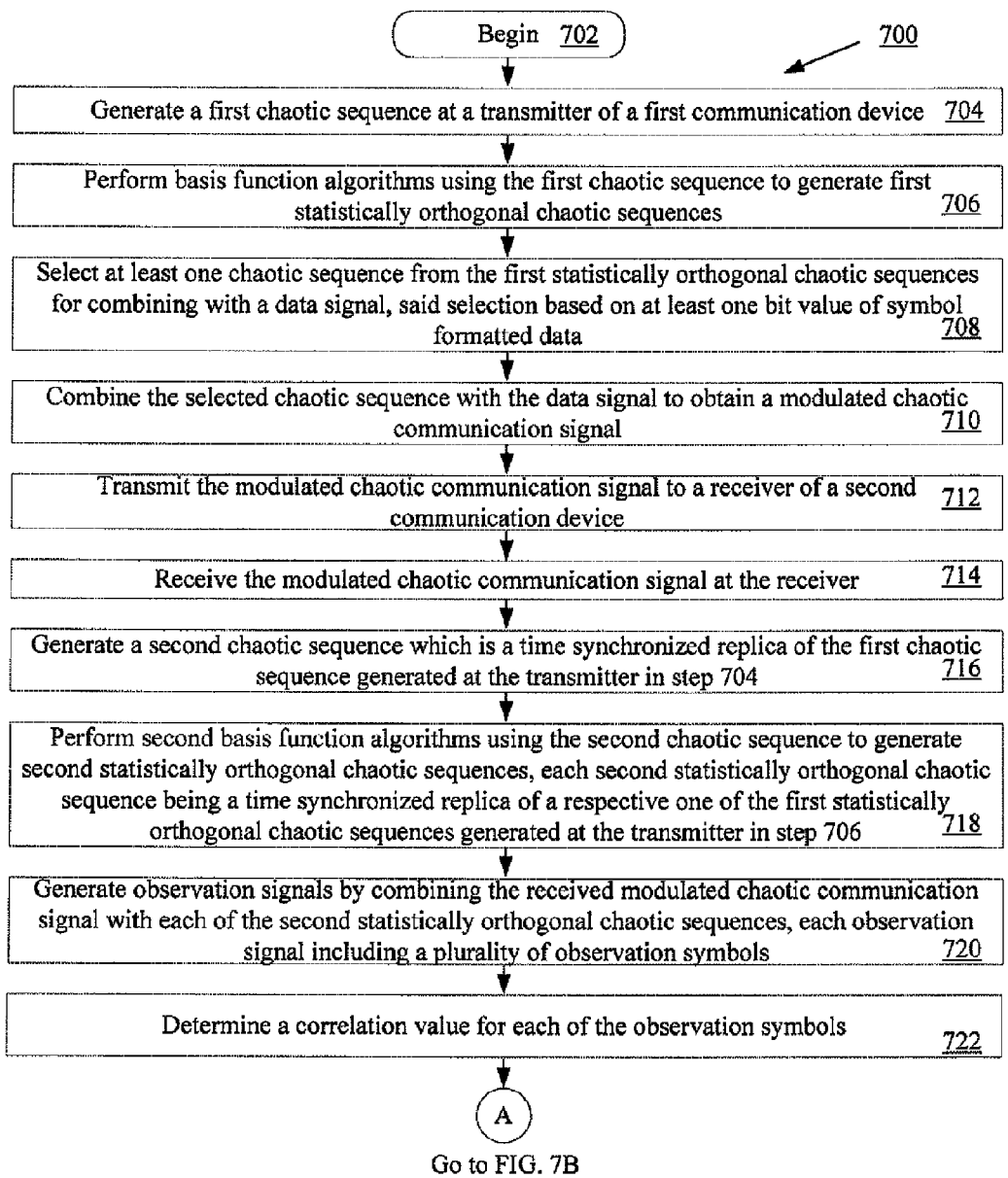
FIGS. 7A-7B collectively provide a flow diagram of a method for processing a data signal in a communication system that is useful for understanding the present invention.

As shown in FIG. 7A, step 716 involves generating a second chaotic sequence. The second chaotic sequence is a time synchronized replica of the first chaotic sequence generated at the transmitter in the previous step 704. More particularly, the first and second chaotic sequences are the same numerical sequences which are time synchronized to the received analog chaotic signal, i.e., a sampling rate of each of the first and second chaotic sequences is the same as a sampling rate of a transmitted analog chaotic signal and is synchronized with a clock of the transmitter.

In step 718, second basis function algorithms are performed using the second chaotic sequence to generate second statistically orthogonal chaotic sequences. Each second statistically orthogonal chaotic sequence is a time synchronized replica of a respective one of the first statistically orthogonal chaotic sequences generated at the transmitter in previous step 706. The second statistically orthogonal algorithms can include, but are not limited to, bijective functions, rotation algorithms, scrambling algorithms, XOR algorithms and encryption algorithms. The second statistically orthogonal algorithms can also include, but are not limited to, uniform statistics preserving transformations, statistical shaping transformations, time-delayed statistical shaping transformations and fractal evolution statistical shaping transformations.

After completing step 718, the method 700 continues with step 720. In step 720, observation signals are generated by combining the received modulated chaotic communication signal with each of the second statistically orthogonal chaotic sequences. Each of the observation signals includes a plurality of observations. Subsequent to step 720, step 722 is performed where correlation values for each observation of the observation signals are determined. Each correlation value is defined by at least the magnitude and/or phase of a respective observation symbol of the respective observation signal. Thereafter, the method 700 continues with step 724 of FIG. 7B.

Figure 7B:
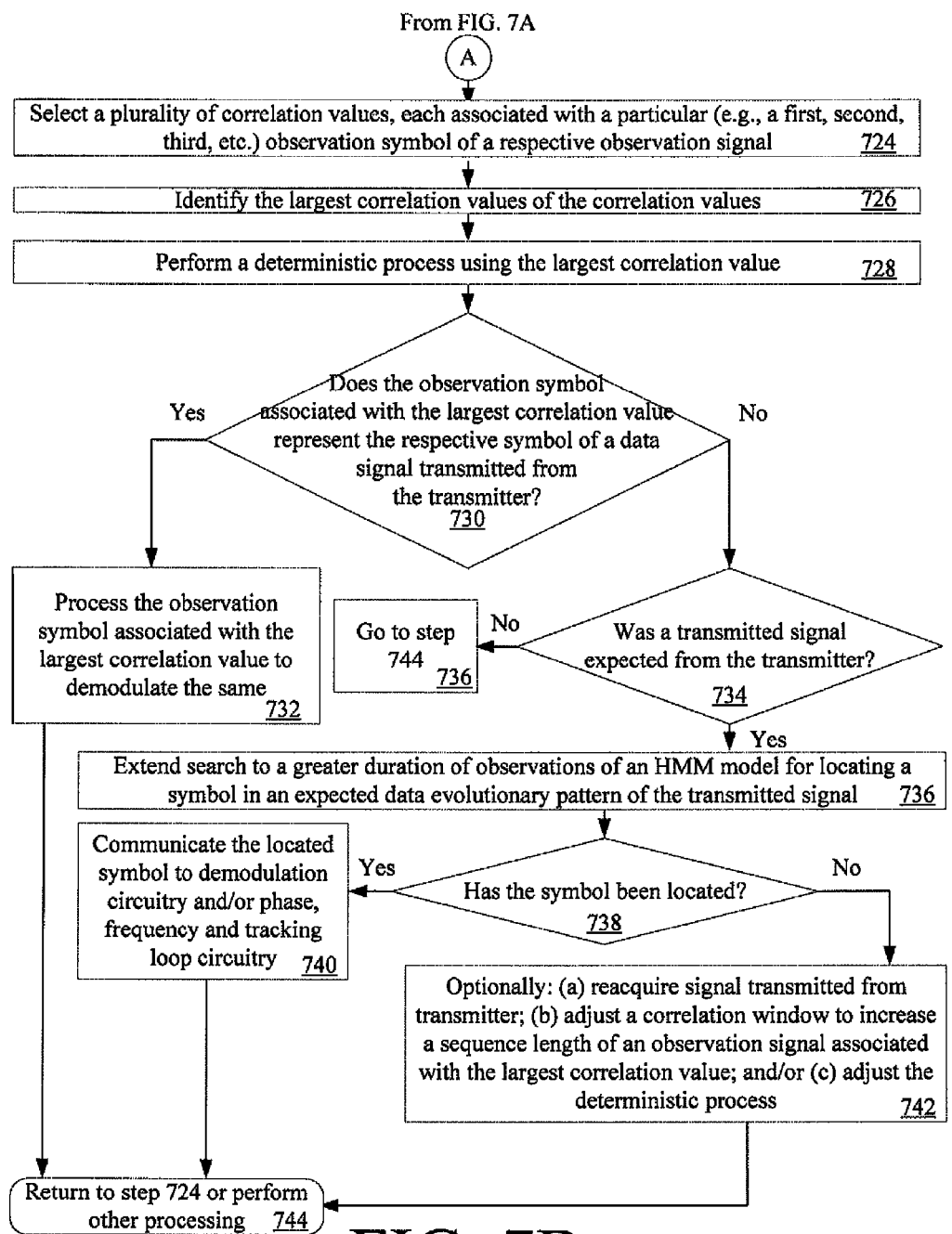

As shown in FIG. 7B, step 724 generally involves selecting a plurality of correlation values. Each selected correlation value is associated with a particular (e.g., a first, second, third, etc. . . . ) observation of a respective observation signal. In a next step 726, the largest correlation value of the selected correlation values is identified. The identified largest correlation value is used in a deterministic process as shown by step 728. The deterministic process is generally performed to determine if the observation symbol associated with the largest correlation value represents the respective symbol of a data signal transmitted from the transmitter.

If the observation symbol associated with the largest correlation value is determined to represent the respective symbol of a data signal transmitted from the transmitter [730: YES], then the method 700 continues with step 732. In step 732, the observation symbol is processed to demodulate the same. Thereafter, step 744 is performed where the method 700 returns to step 724 or other processing is performed. Other processing as referred to in step 744 can include, but is not limited to, tracking loop processing.

If the observation symbol associated with the largest correlation value does not represent the respective symbol of a data signal transmitted from the transmitter [730:NO], then the method 700 continues with a decision step 734. If a transmitted signal is not expected from the transmitter [734: NO], then step 744 is performed where the method 700 returns to step 724 or other processing is performed. If a transmitted signal is expected from the transmitter [734:YES], then step 736 is performed where a search is extended to a greater duration of observations of an HMM model for locating a symbol in an expected data evolutionary pattern of the transmitted signal. After the duration of observations has expired, a decision step 738 is performed. If a symbol has been located during the search of the HMM model observations [738:YES], then step 740 is performed where the located symbol is communicated to demodulation circuitry and/or phase, frequency and tracking loop circuitry. If a symbol was not located during the search of the HMM model observations [738:NO], then an optional step 742 is performed. Step 742 can involve: (a) reacquiring a signal transmitted from the transmitter; (b) adjusting a correlation window to increase a sequence length of an observation signal associated with the largest correlation value; and/or (c) adjusting the deterministic process. After completing step 742, step 744 is performed where the method 700 returns to step 724 or other processing is performed.

Chaos Generators and Digital Chaotic Sequence Generation

Figure 8:
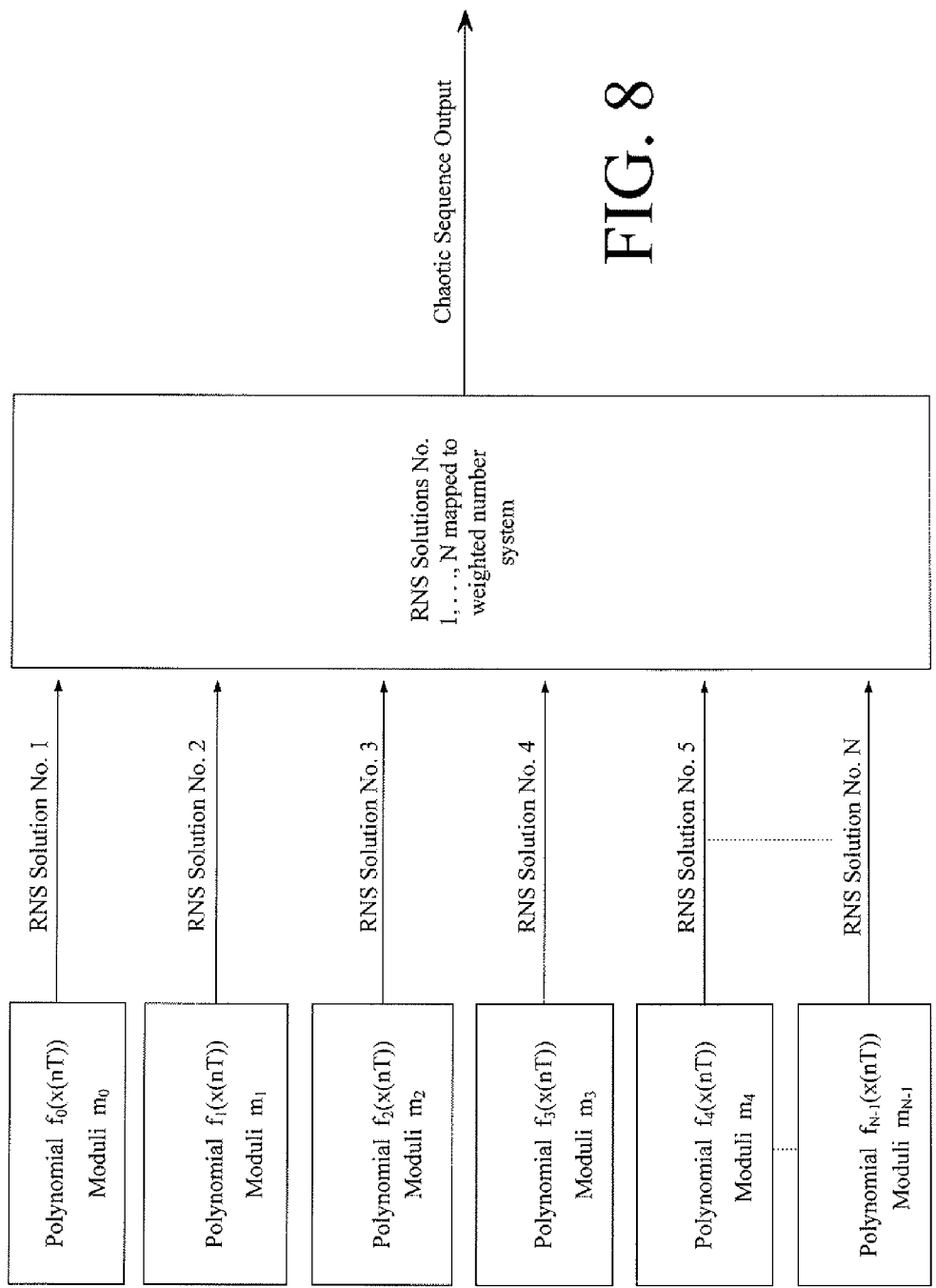
FIG. 8 is a block diagram of a conceptual chaos generator as used in FIGS. 2-6 that is useful for understanding the present invention.

Referring now to FIG. 8, there is provided a conceptual diagram of a chaos generator 218, 468 (described above in relation to FIGS. 2-6). As shown in FIG. 8, generation of the chaotic sequence begins with polynomial equations $f_0(x(nT)), \ldots, f_{N-1}(x(nT))$. The polynomial equations $f_0(x(nT)), \ldots, f_{N-1}(x(nT))$ can be selected as the same polynomial equation or as different polynomial equations. According to an aspect of the invention, the polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation", as used herein, refers to a polynomial equation that cannot be expressed as a product of at least two nontrivial polynomial equations over the same Galois field (f). For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT))\cdot h(x(nT))$.

Each of the polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e., modulo operations. Modulo operations are well known to persons having ordinary skill in the art, and therefore will not be described herein. However, it should be appreciated that an RNS residue representation for some weighted value "a" can be defined by following mathematical equation (7).

$$R = \{a \text{ modulo } m_0, a \text{ modulo } m_1, \ldots, a \text{ modulo } m_{N-1}\} \quad (7)$$

where R is an RNS residue N-tuple value representing a weighted value "a" and $m_0, m_1, \ldots, m_{N-1}$ respectively are the moduli for RNS arithmetic operations applicable to each polynomial equation $f_0(x(nT)), \ldots, f_{N-1}(x(nT))$. $R(nT)$ can be a representation of the RNS solution of a polynomial equation $f(x(nT))$ defined as $R(nT) = \{f_0(x(nT)) \text{ modulo } m_0, f_1(x(nT)) \text{ modulo } m_1, \ldots, f_{N-1}(x(nT)) \text{ modulo } m_{N-1}\}$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers", as used herein, refers to a collection of natural numbers having no common divisors except one (1). Consequently, each RNS arithmetic operation employed for expressing a solution as an RNS residue value uses a different relatively prime number $p_0, p_1, \ldots, p_{N-1}$ as a moduli $m_0, m_1, \ldots, m_{N-1}$.

The RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the polynomial equations $f_0(x(nT)), \ldots, f_{N-1}(x(nT))$ is selected as an irreducible cubic polynomial equation having chaotic properties in Galois field arithmetic. Each of the polynomial equations $f_0(x(nT)), \ldots, f_{N-1}(x(nT))$ can also be selected to be a constant or varying function of time. The irreducible cubic polynomial equation is defined by the following mathematical equation (8).

$$f(x(nT)) = Q(k)x^3(nT) + R(k)x^2(nT) + S(k)x(nT) + C(k,L) \quad (8)$$

where:
x is a variable defining a sequence location;
n is a sample time index value;
k is a polynomial time index value;
L is a constant component time index value;
T is a fixed constant having a value representing a time interval or increment;
Q, R, and S are coefficients that define the polynomial equation $f(x(nT))$; and
C is a coefficient of $x(nT)$ raised to a zero power and is therefore a constant for each polynomial characteristic.

In a preferred embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Embodiments of the present invention are not limited in this regard.

According to another embodiment of the invention, the polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |

TABLE 1-continued

| Moduli values $m_0, m_1, \ldots, m_{N-1}$: | Sets of constant values $C_0, C_1, \ldots, C_{N-1}$: |
|---|---|
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Embodiments of the present invention are not limited in this regard.

The number of discrete magnitude states (dynamic range) that can be generated with the system shown in FIG. 8 will depend on the quantity of polynomial equations N and the modulus values $m_0, m_1, \ldots, m_{N-1}$ values selected for the RNS number systems. In particular, this value can be calculated as the product $M = m_0 \cdot m_1 \cdot m_3 \cdot m_4 \cdot \ldots \cdot m_{N-1}$.

Referring again to FIG. 8, it should be appreciated that each of the RNS solutions No. 1, . . . , No. N is expressed in a binary number system representation. As such, each of the RNS solutions No. 1, . . . , No. N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by the following mathematical equation (9).

$$BL = \text{Ceiling}[\text{Log } 2(m)] \quad (9)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_0(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_0(x(nT))$ are in the range of zero (0) and four hundred sixty six (466) which can be represented in nine (9) binary digits. Possible solutions for $f_0(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows:

$p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of every M times T seconds, i.e., a sequence repetition times an interval of time between exact replication of a sequence of generated values. Embodiments of the present invention are not limited in this regard.

Referring again to FIG. 8, the RNS solutions No. 1, . . . , No. N are mapped to a weighted number system representation thereby forming a chaotic sequence output. The phrase "weighted number system", as used herein, refers to a number system other than a residue number system. Such weighted number systems include, but are not limited to, an integer number system, a binary number system, an octal number system, and a hexadecimal number system.

According to an aspect of the invention, the RNS solutions No. 1, . . . , No. N are mapped to a weighted number system representation by determining a series of digits in the weighted number system based on the RNS solutions No. 1, . . . , No. N. The term "digit", as used herein, refers to a symbol of a combination of symbols to represent a number. For example, a digit can be a particular bit of a binary sequence. According to another aspect of the invention, the RNS solutions No. 1, . . . , No. N are mapped to a weighted number system representation by identifying a number in the weighted number system that is defined by the RNS solutions No. 1, . . . , No. N. According to yet another aspect of the invention, the RNS solutions No. 1, . . . , No. N are mapped to a weighted number system representation by identifying a truncated portion of a number in the weighted number system that is defined by the RNS solutions No. 1, . . . , No. N. The truncated portion can include any serially arranged set of digits of the number in the weighted number system. The truncated portion can also be exclusive of a most significant digit of the number in the weighted number system. The truncated portion can be a chaotic sequence with one or more digits removed from its beginning and/or ending. The truncated portion can also be a segment including a defined number of digits extracted from a chaotic sequence. The truncated portion can further be a result of a partial mapping of the RNS solutions No. 1, . . . , No. N to a weighted number system representation.

According to an embodiment of the invention, a mixed-radix conversion method is used for mapping RNS solutions No. 1, . . . , No. N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1. \text{" See Id.}$$

For conversion from the RNS to a mixed-radix system, a set of moduli are chosen so that $m_i=R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i=R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x-a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, a_2 = \left\langle \left\lfloor \frac{x}{m_1} \right\rfloor \right\rangle_{m_2}, a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}."$$

See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions No. 1, . . . , No. N to a weighted number system representation. The CRT arithmetic operation can be defined by a mathematical equation (9) [returning to zero (0) based indexing].

$$Y(nT) = \quad (10)$$

$$\left\{ \begin{array}{c} \left[ \langle (3x_0^3(nT) + 3x_0^2(nT) + x_0(nT) + C_0)b_0 \rangle_{p_0} \right] \frac{M}{p_0} + \ldots + \\ \left[ \langle (3x_{N-1}^3(nT) + 3x_{N-1}^2(nT) + x_{N-1}(nT) + C_{N-1})b_{N-1} \rangle_{p_{N-1}} \right] \frac{M}{p_{N-1}} \end{array} \right\}_M$$

where Y(nT) is the result of the CRT arithmetic operation;
n is a sample time index value;
T is a fixed constant having a value representing a time interval or increment;
$x_0$-$x_{N-1}$ are RNS solutions No. 1, . . . , No. N;
$p_0, p_1, \ldots, P_{N-1}$ are prime numbers;
M is a fixed constant defined by a product of the relatively prime numbers $p_0, p_1, \ldots p_{N-1}$; and
$b_0, b_1, b_{N-1}$ are fixed constants that are chosen as the multiplicative inverses of the product of all other primes modulo $p_0, p_1, \ldots, p_{N-1}$, respectively.
Equivalently, $$b_j = \left( \frac{M}{p_j} \right)^{-1} \mod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus for certain embodiments of the present invention, the $b_j$'s can be set to unity.

In such embodiments of the present invention, all $b_j$'s can be set equal to one (1) without loss of the chaotic properties resulting in mathematical equation (11).

$$Y(nT) = \quad (11)$$

$$\left\{ \begin{array}{c} \left[ \langle 3x_0^3(nT) + 3x_0^2(nT) + x_0(nT) + C_0 \rangle_{p_0} \right] \frac{M}{p_0} + \ldots + \\ \left[ \langle 3x_{N-1}^3(nT) + 3x_{N-1}^2(nT) + x_{N-1}(nT) + C_{N-1} \rangle_{p_{N-1}} \right] \frac{M}{p_{N-1}} \end{array} \right\}_M$$

The invention is not limited in this regard.

Referring again to FIG. 8, the chaotic sequence output Y(nT) can be expressed in a binary number system representation. As such, the chaotic sequence output Y(nT) can be represented as a binary sequence. Each bit of the binary sequence has a zero (0) value or a one (1) value. The chaotic sequence output Y(nT) can have a maximum bit length (MBL) defined by the following mathematical equation (12).

$$MBL = \text{Ceiling}[\text{Log } 2(M)] \quad (12)$$

where M is the product of the relatively prime numbers $p_0$, $p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range", as used herein, refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059,523). By substituting the value of M into Equation (11), the bit length (BL) for a chaotic sequence output Y expressed in a binary system representation can be calculated as follows: BL=Ceiling[Log 2(3,563,762,191,059,523)]=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, chaotic sequence output Y can be a binary sequence representing a truncated portion of a value between zero (0) and M−1. In such a scenario, the chaotic sequence output Y can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (7) can be rewritten in a general iterative form: $f(x(nT))=Q(k)x^3((n-1)T)+R(k)x^2((n-1)T)+S(k)x((n-1)T)+C(k,L)$. For example, a fixed coefficient polynomial equation is selected as $f(x(n \cdot 1 \text{ ms}))=3x^3((n-1)\cdot 1 \text{ ms})+3x^2((n-1)\cdot 1 \text{ ms})+x((n-1)\cdot 1 \text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 9:
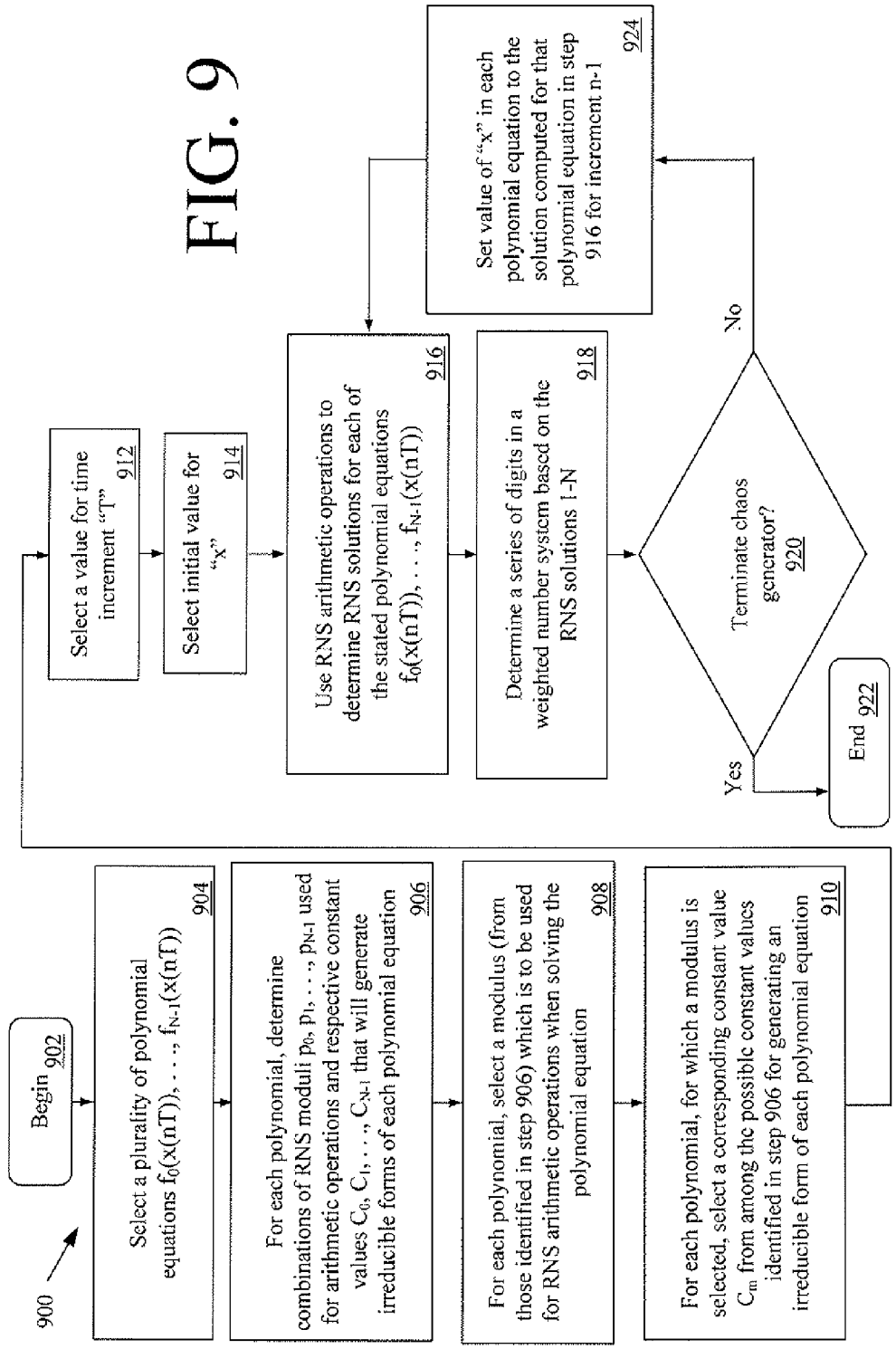
FIG. 9 is a flow diagram of a method for generating a chaotic sequence that is useful for understanding the present invention.

Referring now to FIG. 9, there is provided a flow diagram of a method 900 for generating a chaotic sequence according to an embodiment of the invention. As shown in FIG. 9, method 900 begins with step 902 and continues with step 904. In step 904, a plurality of polynomial equations $f_0(x(nT)), \ldots, f_{N-1}(x(nT))$ are selected. The polynomial equations $f_0(x(nT)), \ldots, f_{N-1}(x(nT))$ can be selected as the same polynomial equation except for a different constant term or different polynomial equations. After step 904, step 906 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 908, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. The modulus is selected from the moduli identified in step 906. It should also be appreciated that a different modulus is advantageously selected for each polynomial equation $f_0(x(nT)), \ldots, f_{N-1}(x(nT))$.

As shown in FIG. 9, method 900 continues with a step 910. In step 910, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 906 for generating an irreducible form of the respective polynomial equation $f_0(x(nT)), \ldots, f_{N-1}(x(nT))$.

After step 910, method 900 continues with step 912. In step 912, a value for time increment "T" is selected. Thereafter, an initial value for the variable "x" of the polynomial equations is selected in step 914. Notably, the initial value of the variable "x" defines a sequence starting location, i.e., the initial value of the variable "x" defines a static offset of a chaotic sequence Y(nT). In step 916, RNS arithmetic operations are used to iteratively determine RNS solutions for each of the stated polynomial equations $f_0(x(nT)), \ldots, f_{N-1}(x(nT))$. In step 918, a series of digits in a weighted number system are determined based in the RNS solutions. Step 918 can involve performing a mixed radix arithmetic operation or a CRT arithmetic operation using the RNS solutions to obtain a chaotic sequence output.

After step 918, the method 900 continues with a decision step 920. If a chaos generator is not terminated (820:NO), then step 924 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 916. Subsequently, method 900 returns to step 916. If the chaos generator is terminated (920:YES), then step 922 is performed where method 900 ends.

Figure 10:
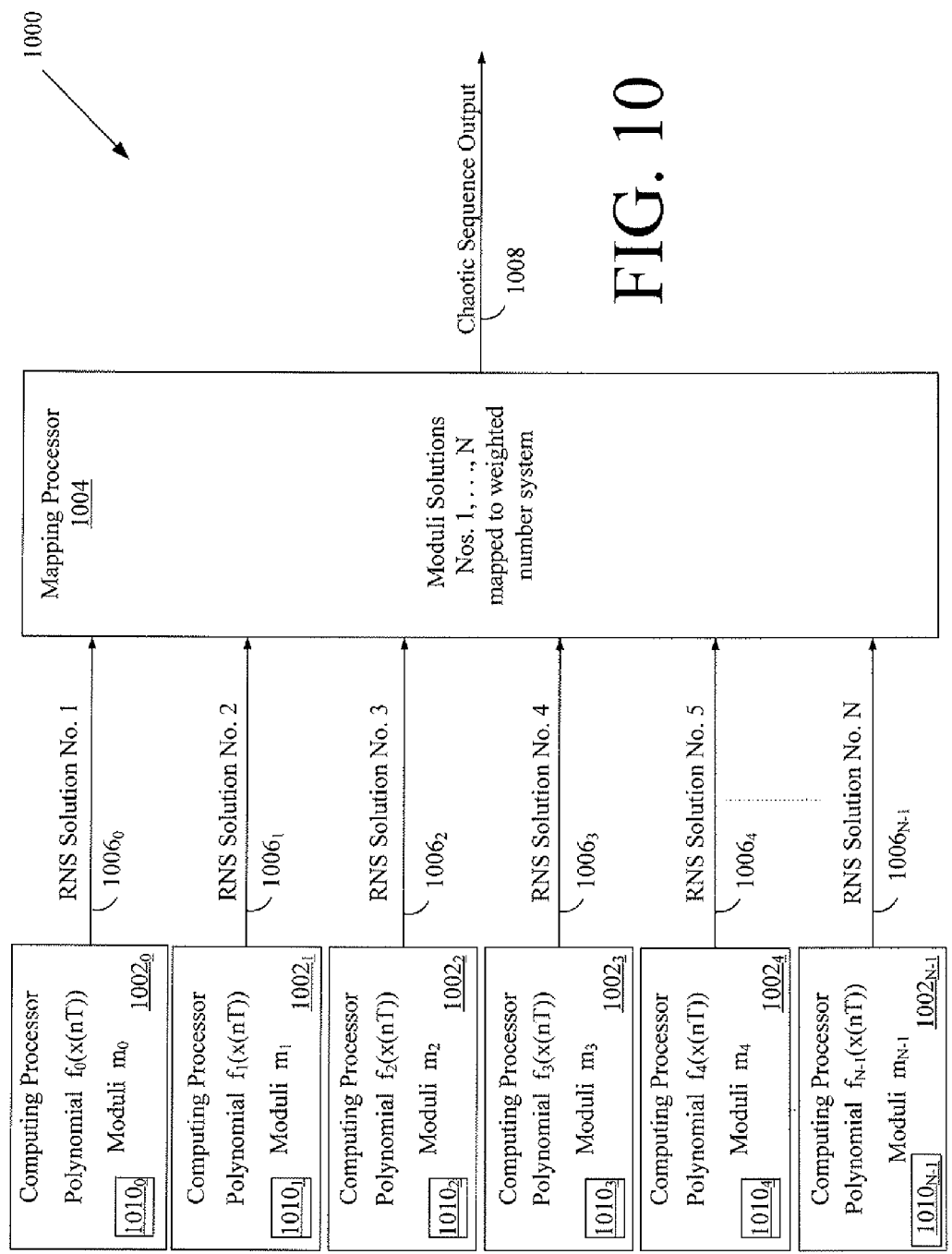
FIG. 10 is a block diagram of the chaos generator of FIGS. 2-6 that is useful for understanding the present invention.

Referring now to FIG. 10, there is illustrated one embodiment of chaos generator 1000. Notably, the chaos generators 218, 468 described above can be the same as or similar to the chaos generator 1000. As such, the following discussion of the chaos generator 1000 is sufficient for understanding the chaos generators 218, 468.

Chaos generator 1000 is generally comprised of hardware and/or software configured to generate a digital chaotic sequence. Accordingly, chaos generator 1000 is comprised of computing processors $1002_0, \ldots, 1002_{N-1}$. Chaos generator 1000 is also comprised of a mapping processor 1004. Each computing processor $1002_0, \ldots, 1002_{N-1}$ is coupled to the mapping processor 1004 by a respective data bus $1006_0, \ldots, 1006_{N-1}$. As such, each computing processor $1002_0, \ldots, 1002_{N-1}$ is configured to communicate data to the mapping processor 1004 via a respective data bus $1006_0, \ldots, 1006_{N-1}$. The mapping processor 1004 can be coupled to an external device (not shown in FIG. 9) via a data bus 1008. The external device (not shown in FIG. 9) includes, but is not limited to, a communications device configured to combine or modify a signal in accordance with a chaotic sequence output.

Referring again to FIG. 9, the computing processors $1002_0, \ldots, 1002_{N-1}$ are comprised of hardware and/or software configured to solve the polynomial equations $f_0(x(nT)), \ldots, f_{N-1}(x(nT))$ to obtain a plurality of solutions. The polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The polynomial equations $f_0(x(nT)), \ldots, f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The polynomial equations $f_0(x(nT)), f_{N-1}(x(nT))$ can further be selected as a constant or varying function of time.

Each of the solutions can be expressed as a unique residue number system (RNS) N-tuple representation. In this regard, it should be appreciated that the computing processors $1002_0, \ldots, 1002_{N-1}$ employ modulo operations to calculate a respective solution for each polynomial equation $f_0(x(nT)), \ldots, f_{N-1}(x(nT))$ using modulo based arithmetic operations. Each of the computing processors $1002_0, \ldots, 1002_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $1002_0, \ldots, 1002_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $1002_0, \ldots, 1002_{N-1}$ are further comprised of hardware and/or software configured to utilize moduli $m_0, m_1, m_{N-1}$ selected for each polynomial equation $f_0(x(nT)), \ldots, f_{N-1}(x(nT))$ so that solutions iteratively computed via a feedback mechanism $1010_0, \ldots, 1010_{N-1}$ are chaotic. In this regard, it should be appreciated that the feedback mechanisms $1010_0, \ldots, 1010_{N-1}$ are provided so that the solutions for each polynomial equation $f_0(x(nT)), \ldots, f_{N-1}(x(nT))$ can be iteratively computed. Accordingly, the feedback mechanisms $1010_0, \ldots, 1010_{N-1}$ are comprised of hardware and/or software configured to selectively define a variable "x" of a polynomial equation as a solution computed in a previous iteration.

Referring again to FIG. 10, the computing processors $1002_0, \ldots, 1002_{N-1}$ are further comprised of hardware and/or software configured to express each of the RNS residue values in a binary number system representation. In this regard, the computing processors $1002_0, \ldots, 1002_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions No. 1, . . . , No. N comprising the elements of an RNS N-tuple.

According to an embodiment of the invention, the computing processors $1002_0, \ldots, 1002_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Embodiments of the present invention are not limited in this regard.

Referring again to FIG. 10, the mapping processor 1004 is comprised of hardware and/or software configured to map the moduli (RNS N-tuple) solutions No. 1, . . . , No. N to a weighted number system representation. The result is a series of digits in the weighted number system based on the moduli solutions No. 1, . . . , No. N. For example, the mapping processor 904 can be comprised of hardware and/or software configured to determine the series of digits in the weighted number system based on the RNS residue values using a Chinese Remainder Theorem process. In this regard, it will be appreciated by those skilled in the art that the mapping processor 1004 is comprised of hardware and/or software configured to identify a number in the weighted number system that is defined by the moduli solutions No. 1, . . . , No. N.

According to an aspect of the invention, the mapping processor 1004 can be comprised of hardware and/or software configured to identify a truncated portion of a number in the weighted number system that is defined by the moduli solutions No. 1, . . . , No. N. For example, the mapping processor 1004 can also be comprised of hardware and/or software configured to select the truncated portion to include any serially arranged set of digits of the number in the weighted number system. Further, the mapping processor 1004 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Embodiments of the present invention are not limited in this regard.

Referring again to FIG. 10, the mapping processor 1004 is comprised of hardware and/or software configured to express a chaotic sequence in a binary number system representation. In this regard, it should be appreciated that the mapping processor 1004 can employ a weighted-to-binary conversion method. Weighted-to-binary conversion methods are generally known to persons having ordinary skill in the art, and therefore will not be described herein. However, it should be appreciated that any such weighted-to-binary conversion method can be used without limitation.

It should be noted that the transmitter 102 is configured to generate a chaotic sequence using the chaotic sequence generation method described above in relation to FIGS. 8-10. The transmitter 102 is also configured to process the chaotic sequence for generating a plurality of orthogonal basis function chaotic sequences. At least one of the plurality of basis function chaotic sequences is selected for spreading a signal over a large frequency band. The spread spectrum signal can be transmitted from the transmitter 102 to a receiver (e.g., the receiver 104 described above in relation to FIG. 1). At the receiver, at least one appropriate basis function chaotic sequence(s) is used to recover the original signal intended for a particular user. Accordingly, the receiver is configured to generate replicas of the plurality of orthogonal basis function chaotic spreading codes using the chaotic sequence generation method described above in relation to FIGS. 8-10.

All of the apparatus, methods, and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved.

All such similar substitutes and modifications apparent to those skilled in the art are deemed to be within the spirit, scope and concept of the invention as defined.

I claim:

1. A method for processing a data signal in a communications system, comprising:
generating a first chaotic sequence at a transmitter of a first communication device;
performing at least two first basis function algorithms using said first chaotic sequence to generate a plurality of statistically orthogonal chaotic sequences;
dynamically selecting a combination of at least two different sequences from said plurality of statistically orthogonal chaotic sequences based on a value of at least a first bit of symbol formatted data;
combining each of said two different sequences with a first data signal to obtain at least two modulated chaotic communication signals containing the same information of the first data signal;
combining said modulated chaotic communication signals to obtain a transmit signal; and
transmitting said transmit signal from said transmitter of said first communication device to a receiver of a second communication device.

2. The method according to claim 1, further comprising selecting each of said first basis function algorithms from the group consisting of a bijective function, a rotation algorithm, a scrambling algorithm, an XOR algorithm, an encryption algorithm, a uniform statistics preserving transformation, a statistical shaping transformation, a time-delayed statistical shaping transformation, and a fractal evolution statistical shaping transformation.

3. The method according to claim 1, further comprising:
receiving said combined signal at said receiver; and
processing said combined signal to obtain data therefrom.

4. A method for processing a data signal in a communications system, comprising the steps of:
generating a first chaotic sequence at a transmitter of a first communication device;
performing at least two first basis function algorithms using said first chaotic sequence to generate at least two first statistically orthogonal chaotic sequences;
selecting at least one sequence from said first statistically orthogonal chaotic sequences for combining with a first data signal;
combining said selected sequence with a second data signal to obtain a modulated chaotic communication signal; and
transmitting said modulated chaotic communication signal to a receiver of a second communication device;
receiving said modulated chaotic communication signal at said receiver; and
processing said received modulated chaotic communication signal to obtain data therefrom;
wherein said processing step further comprises:
generating a second chaotic sequence which is a time synchronized replica of said first chaotic sequence generated at said transmitter;
performing at least two second basis function algorithms using said second chaotic sequence to generate at least two second statistically orthogonal chaotic sequences, each said second statistically orthogonal chaotic sequence being a time synchronized replica of a respective one of said first statistically orthogonal chaotic sequences generated at said transmitter; and
combining said received modulated chaotic communication signal with each of said second statistically orthogonal chaotic sequences to generate at least two observation signals each including a plurality of observations.

5. The method according to claim 4, further comprising selecting each of said second basis function algorithms from the group consisting of a bijective function, a rotation algorithm, a scrambling algorithm, an XOR algorithm and an encryption algorithm.

6. The method according to claim 4, further comprising selecting each of said second basis function algorithms from the group consisting of a uniform statistics preserving transformation, a statistical shaping transformation, a time-delayed statistical shaping transformation, and a fractal evolution statistical shaping transformation.

7. The method according to claim 4, wherein said processing step further comprises determining a plurality of correlation values for said observation symbols, each said correlation value associated with a respective one of said observation symbols.

8. The method according to claim 7, wherein each said correlation value is defined by at least one of a magnitude and a phase of said respective one of said observations.

9. The method according to claim 7, wherein said processing step further comprises:
selecting a first set of correlation values from said plurality of correlation values; and
identifying a largest correlation value from said first set of correlation values.

10. The method according to claim 9, wherein further comprising performing a deterministic process using at least said largest correlation value to determine if an observation associated with said largest correlation value represents a symbol of said first data signal.

11. The method according to claim 10, further comprising selecting said deterministic process to include a Hidden Markov Model deterministic process.

12. The method according to claim 10, further comprising selecting said deterministic process from the group consisting of a decision tree based deterministic process and a fractal evolutionary diagram based deterministic process.

13. The method according to claim 10, further comprising demodulating said observation associated with said largest correlation value if said observation associated with said largest correlation is determined to represent a symbol of said first data signal.

14. The method according to claim 10, further comprising adjusting a correlation window to increase a sequence length of said observation signal associated with said largest correlation value if said observation associated with said largest correlation is not determined to represent a symbol of said first data signal.

15. The method according to claim 10, further comprising adjusting said deterministic process in accordance with results of a comparison of said observation signals to an a priori known sequence of data symbols from said first data signal.

16. A method for processing a modulated chaotic communication signal at a receiver of a communications system, comprising the steps of:
receiving, at said receiver, said modulated chaotic communication signal transmitted from a transmitter;
generating a first chaotic sequence which is a time synchronized replica of a second chaotic sequence generated at said transmitter;
performing at least two basis function algorithms using said first chaotic sequence to generate at least two first statistically orthogonal chaotic sequences, each of said first statistically orthogonal chaotic sequence being a time synchronized replica of a respective one of a plurality of second statistically orthogonal chaotic sequences generated at said transmitter;

generating at least two observation signals by combining said received modulated chaotic communication signal with each of said first statistically orthogonal chaotic sequences including a plurality of observations;

determining a plurality of correlation values for said observations, each said correlation value associated with a respective one of said observations;

selecting a set of correlation values from said plurality of correlation values;

identifying a largest correlation value from said set of correlation values; and performing a deterministic process using at least said largest correlation value to determine if an observation associated with said largest correlation value represents a symbol of said first data signal.

17. The method according to claim 16, further comprising selecting each of said basis function algorithms from the group consisting of a bijective function, a rotation algorithm, a scrambling algorithm, an XOR algorithm, an encryption algorithm, a uniform statistics preserving transformation, a statistical shaping transformation, a time-delayed statistical shaping transformation, and a fractal evolution statistical shaping transformation.

18. The method according to claim 16, wherein each said correlation value is defined by at least one of a magnitude and a phase of a respective observation.

19. The method according to claim 16, further comprising selecting said deterministic process to include a Hidden Markov Model deterministic process.

20. The method according to claim 16, further comprising selecting said deterministic process from the group consisting of a decision tree based deterministic process and a fractal evolutionary based deterministic process.

21. The method according to claim 16, further comprising demodulating said observation associated with said largest correlation value if said observation associated with said largest correlation is determined to represent a symbol of said first data signal.

22. The method according to claim 16, further comprising adjusting a correlation window to increase a sequence length of said observation signal associated with said largest correlation value if said observation associated with said largest correlation is not determined to represent a symbol of said first data signal.

23. The method according to claim 16, further comprising adjusting said deterministic process in accordance with results of a comparison of said observation signals to an a priori known sequence of data symbols from said first data signal.

24. A communication system, comprising:
a first chaos generator configured to generate a first chaotic sequence;
a plurality of first sequence generators configured to perform first basis function algorithms using said first chaotic sequence to generate a plurality of first statistically orthogonal chaotic sequences;
a first sequence selector configured to dynamically select a combination of at least two sequences from said plurality of first statistically orthogonal chaotic sequences based on a value of at least a first bit of symbol formatted data;

a first complex multiplier configured to combine each of said two different sequences with a first data signal to obtain at least two modulated chaotic communication signals containing the same information of the first data signal;
a combiner configured to combine said modulated chaotic communication signals to obtain a combined signal; and
a transmitter configured to transmit said combined signal to a receiver.

25. The communication system according to claim 24, wherein each of said first basis function algorithms is selected from the group consisting of a bijective function, a rotation algorithm, a scrambling algorithm, an XOR algorithm, an encryption algorithm, a uniform statistics preserving transformation, a statistical shaping transformation, a time-delayed statistical shaping transformation, and a fractal evolution statistical shaping transformation.

26. The communication system according to claim 24, further comprising:
a receiver configured to receive said combined signal; and
at least one processing device configured to process said combined signal to obtain data therefrom.

27. A communication system, comprising:
a first chaos generator configured for generating a first chaotic sequence;
a plurality of first sequence generators configured for performing first basis function algorithms using said first chaotic sequence to generate first statistically orthogonal chaotic sequences;
a first sequence selector configured for selecting at least one sequence from said first statistically orthogonal chaotic sequences for combining with a first data signal;
a first complex multiplier configured for combining said selected sequence with a second data signal to obtain a modulated chaotic communication signal; and
a transmitter configured for transmitting said modulated chaotic communication signal to a receiver;
a receiver configured for receiving said modulated chaotic communication signal at said receiver; and
at least one processing device configured for processing said received modulated chaotic communication signal to obtain data therefrom;
wherein said processing device is further configured for
generating a second chaotic sequence which is a time synchronized replica of said first chaotic sequence generated at said transmitter,
performing at least two second basis function algorithms using said second chaotic sequence to generate at least two second statistically orthogonal chaotic sequences, each said second statistically orthogonal chaotic sequence being a time synchronized replica of a respective one of said first statistically orthogonal chaotic sequences generated at said transmitter, and
combining said received modulated chaotic communication signal with each of said second statistically orthogonal chaotic sequences to generate at least two observation signals each including a plurality of observation symbols.

28. The communication system according to claim 27, wherein each of said second basis function algorithms is selected from the group consisting of a bijective function, a rotation algorithm, a scrambling algorithm, an XOR algorithm, an encryption algorithm, a uniform statistics preserving transformation, a statistical shaping transformation, a time-delayed statistical shaping transformation, and a fractal evolution statistical shaping transformation.

39

29. The communication system according to claim 28, wherein said processing device is further configured for determining a plurality of correlation values for said observations, each said correlation value associated with a respective one of said observations.

30. The communication system according to claim 29, wherein each said correlation value is defined by at least one of a magnitude and a phase of said respective one of said observations.

31. The communication system according to claim 29, wherein said processing device is further configured for
selecting a first set of correlation values from said plurality of correlation values, and
identifying a largest correlation value from said first set of correlation values.

32. The communication system according to claim 31, wherein said processing device is further configured for performing a deterministic process using at least said largest correlation value to determine if an observation associated with said largest correlation value represents a symbol of said first data signal.

33. The communication system according to claim 32, wherein said deterministic process comprises a Hidden Markov Model deterministic process.

34. The communication system according to claim 32, wherein said deterministic process is selected from the group consisting of a decision tree based deterministic process and a fractal evolutionary diagram based deterministic process.

35. The communication system according to claim 32, wherein said processing device is further configured for demodulating said observation associated with said largest correlation value if said observation associated with said largest correlation is determined to represent a symbol of said first data signal.

36. The communication system according to claim 32, wherein said processing device is further configured for adjusting a correlation window to increase a sequence length of said observation signal associated with said largest correlation value if said observation associated with said largest correlation is not determined to represent a symbol of said first data signal.

37. The communication system according to claim 32, wherein said processing device is further configured for adjusting said deterministic process in accordance with results of a comparison of said observation signals to an a priori known sequence of data symbols from said first data signal.

38. A communication system, comprising:
a receiver configured to receive a modulated chaotic spread spectrum communication signal transmitted from a transmitter; and
at least one processing device configured to
generate a first chaotic sequence which is a time synchronized replica of a second chaotic communication sequence generated at said transmitter,
perform at least two first basis function algorithms using said first chaotic sequence to generate at least two first statistically orthogonal chaotic sequences, each said first statistically orthogonal chaotic sequence being a time synchronized replica of a respective one of second statistically orthogonal chaotic sequences generated at said transmitter,
combine said received modulated chaotic spread spectrum communication signal with each of said first statistically orthogonal chaotic sequences including a plurality of observations to generate at least two observation signals;

40 determine a plurality of correlation values for said observations, each said correlation value associated with a respective one of said observations;
select a set of correlation values from said plurality of correlation values;
identify a largest correlation value from said set of correlation values;
perform a deterministic process using at least said largest correlation value to determine if an observation associated with said largest correlation value represents a symbol of said first data signal; and
demodulate said observation associated with said largest correlation value if said observation associated with said largest correlation is determined to represent said respective one of a plurality of possible transmitted data symbols.

39. The communication system according to claim 38, wherein each of said first basis function algorithms is selected from the group consisting of a bijective function, a rotation algorithm, a scrambling algorithm, an XOR algorithm, an encryption algorithm, a uniform statistics preserving transformation, a statistical shaping transformation, a time-delayed statistical shaping transformation, and a fractal evolution statistical shaping transformation.

40. The communication system according to claim 38, wherein each said correlation value is defined by at least one of a magnitude and a phase of said respective one of said observations.

41. A communication system, comprising:
a receiver configured to receive a modulated chaotic spread spectrum communication signal transmitted from a transmitter; and
at least one processing device configured to
generate a first chaotic sequence which is a time synchronized replica of a second chaotic communication sequence generated at said transmitter,
perform at least two first basis function algorithms using said first chaotic sequence to generate at least two first statistically orthogonal chaotic sequences, each said first statistically orthogonal chaotic sequence being a time synchronized replica of a respective one of second statistically orthogonal chaotic sequences generated at said transmitter,
combine said received modulated chaotic spread spectrum communication signal with each of said first statistically orthogonal chaotic sequences to generate at least two observation signals each including a plurality of observation symbols,
determine a plurality of correlation values for said observations, each said correlation value associates with a respective one of said observations,
select a first set of correlation values from said plurality of correlation values,
identify a largest correlation value from said first set of correlation values; and
perform a deterministic process using at least said largest correlation value to determine if an observation associated with said largest correlation value represents a respective one of a plurality of possible transmitted data symbols.

42. The communication system according to claim 41, wherein said deterministic process comprises a Hidden Markov Model deterministic process.

43. The communication system according to claim 41, wherein said deterministic process is selected from the group consisting of a decision tree based deterministic process and a fractal evolutionary diagram based deterministic process.

44. The communication system according to claim 41, wherein said processing device is further configured for demodulating said observation associated with said largest correlation value if said observation associated with said largest correlation is determined to represent said respective one of a plurality of possible transmitted data symbols.

45. The communication system according to claim 41, wherein said processing device is further configured for adjusting a correlation window to increase a sequence length of said observation signal associated with said largest correlation value if said observation associated with said largest correlation is not determined to represent said respective one of a plurality of possible transmitted data symbols.

* * * * *